(12) United States Patent
Ryu et al.

(10) Patent No.: US 11,894,888 B2
(45) Date of Patent: Feb. 6, 2024

(54) BEAMFORMED CHANNEL BUSY RATIO

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Franklin Park, NJ (US); Juan Montojo, San Diego, CA (US); Jing Sun, San Diego, CA (US); Arumugam Chendamarai Kannan, San Diego, CA (US); Xiaoxia Zhang, San Diego, CA (US); Peter Gaal, San Diego, CA (US); Piyush Gupta, Bridgewater, NJ (US); Xiaojie Wang, Hillsborough, NJ (US); Hua Wang, Basking Ridge, NJ (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 17/167,607

(22) Filed: Feb. 4, 2021

(65) Prior Publication Data

US 2022/0247457 A1    Aug. 4, 2022

(51) Int. Cl.
*H04B 7/0408*  (2017.01)
*H04W 24/08*  (2009.01)
*H04W 92/18*  (2009.01)

(52) U.S. Cl.
CPC .......... *H04B 7/0408* (2013.01); *H04W 24/08* (2013.01); *H04W 92/18* (2013.01)

(58) Field of Classification Search
None
See application file for complete search history.

(56) References Cited

U.S. PATENT DOCUMENTS

| 11,297,629 | B2 * | 4/2022 | Huang | H04W 72/542 |
| 2021/0282143 | A1 * | 9/2021 | Lee | H04W 52/343 |
| 2021/0314796 | A1 * | 10/2021 | Hoang | H04W 52/36 |

FOREIGN PATENT DOCUMENTS

| WO | 2020033477 A1 | 2/2020 |
| WO | 2020257105 | 12/2020 |

OTHER PUBLICATIONS

International Search Report and Written Opinion—PCT/US2022/070293—ISA/EPO—dated May 16, 2022

* cited by examiner

*Primary Examiner* — Shripal K Khajuria
(74) *Attorney, Agent, or Firm* — QUALCOMM Incorporated

(57) ABSTRACT

Various aspects of the present disclosure generally relate to wireless communication. In some aspects, a user equipment (UE) may measure, for a first beam group of a set of beam groups associated with the UE, a first channel busy ratio (CBR) for the first beam group. The UE may receive, from a second UE, an indication of a second CBR for a second beam group associated with the second UE. The UE may transmit, to the second UE using a beam included in the first beam group, a signal using one or more transmit parameters that are based at least in part on at least one of the first CBR or the second CBR. Numerous other aspects are described.

30 Claims, 15 Drawing Sheets

BEAMFORMED CHANNEL BUSY RATIO

FIELD OF THE DISCLOSURE

Aspects of the present disclosure generally relate to wireless communication and to techniques and apparatuses for a beamformed channel busy ratio (CBR).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory, the memory and the one or more processors configured to: measure, for a first beam group of a set of beam groups associated with the UE, a first channel busy ratio (CBR) for the first beam group; receive, from a second UE, an indication of a second CBR for a second beam group associated with the second UE; and transmit, to the second UE using a beam included in the first beam group, a signal using one or more transmit parameters that are based at least in part on at least one of the first CBR or the second CBR.

In some aspects, a method of wireless communication performed by a UE includes measuring, for a first beam group of a set of beam groups associated with the UE, a first CBR for the first beam group; receiving, from a second UE, an indication of a second CBR for a second beam group associated with the second UE; and transmitting, to the second UE using a beam included in the first beam group, a signal using one or more transmit parameters that are based at least in part on at least one of the first CBR or the second CBR.

In some aspects, a non-transitory computer-readable medium storing a set of instructions for wireless communication includes one or more instructions that, when executed by one or more processors of a UE, cause the UE to: measure, for a first beam group of a set of beam groups associated with the UE, a first CBR for the first beam group; receive, from a second UE, an indication of a second CBR for a second beam group associated with the second UE; and transmit, to the second UE using a beam included in the first beam group, a signal using one or more transmit parameters that are based at least in part on at least one of the first CBR or the second CBR.

In some aspects, an apparatus for wireless communication includes means for measuring, for a first beam group of a set of beam groups associated with the apparatus, a first CBR for the first beam group; means for receiving, from a UE, an indication of a second CBR for a second beam group associated with the UE; and means for transmitting, to the UE using a beam included in the first beam group, a signal using one or more transmit parameters that are based at least in part on at least one of the first CBR or the second CBR.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
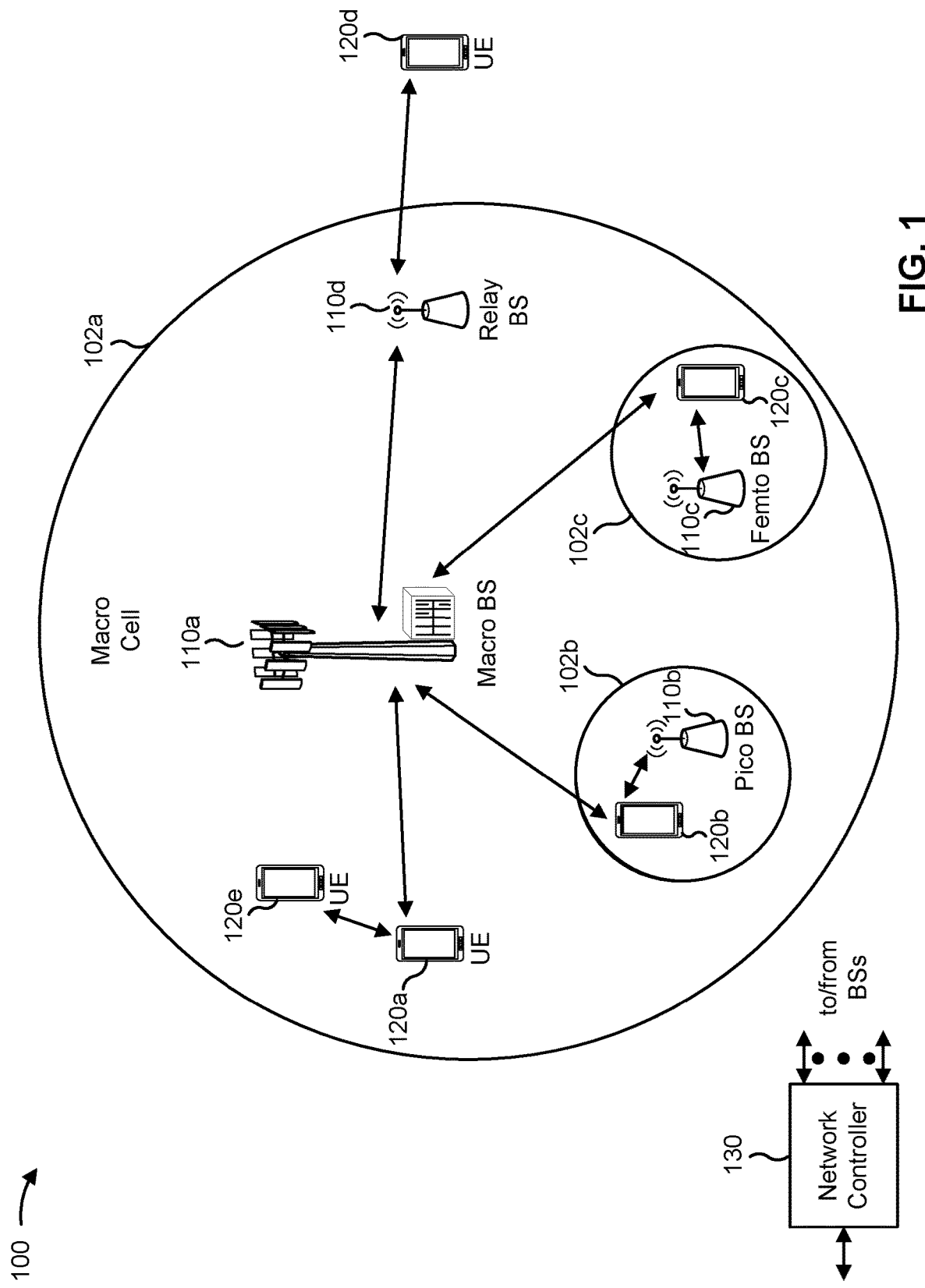
FIG. 1 is a diagram illustrating an example of a wireless network.

FIG. 1 is a diagram illustrating an example of a wireless network 100. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
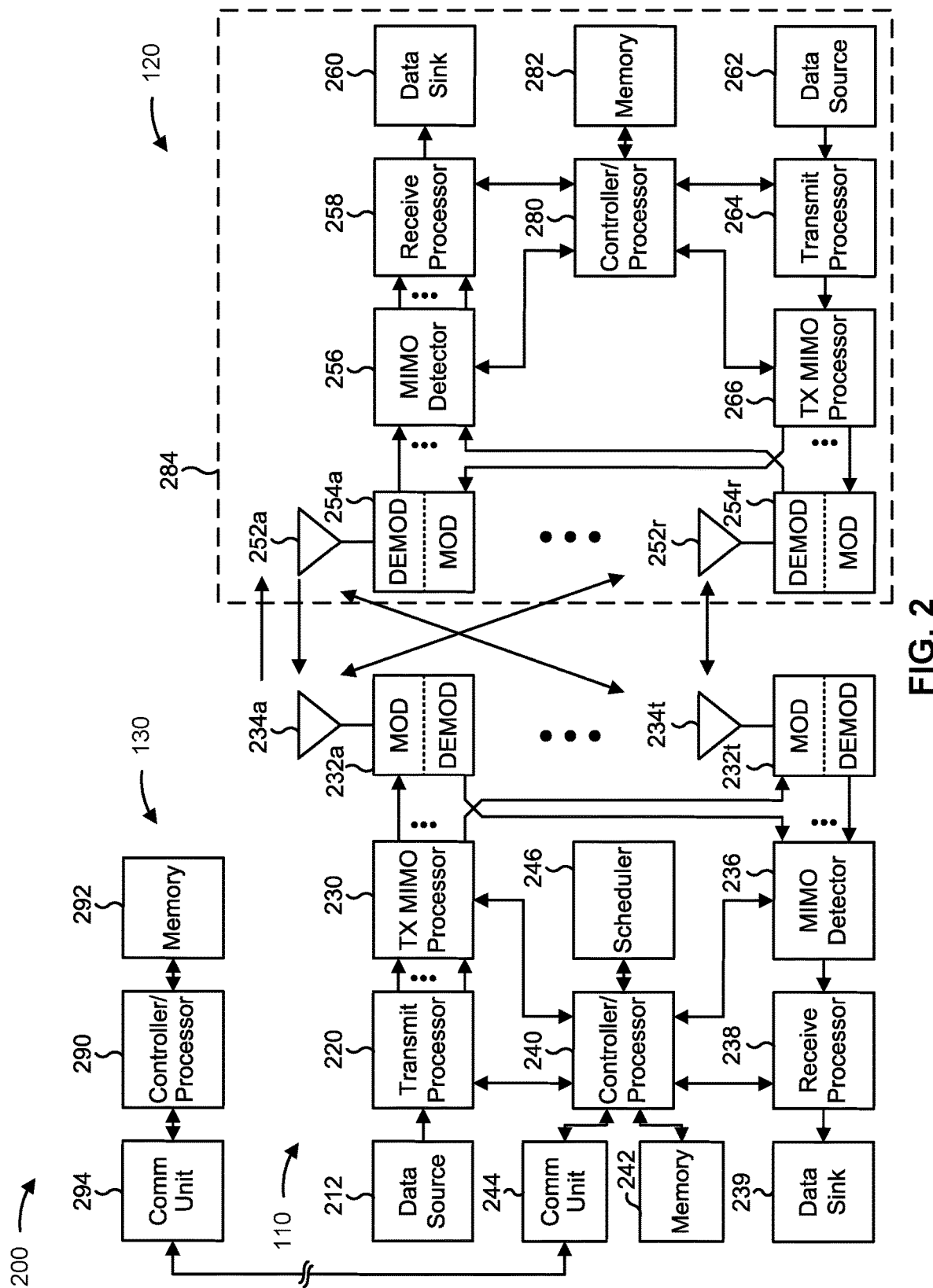
FIG. 2 is a diagram illustrating an example of a base station in communication with a UE in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 8A, 8B, 8C, 9, 10, and/or 11.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 8A, 8B, 8C, 9, 10, and/or 11.

Controller/processor 240 of base station 110, controller/processor 280 of UE 120, and/or any other component(s) of FIG. 2 may perform one or more techniques associated with a beamformed channel busy ratio (CBR), as described in more detail elsewhere herein. For example, controller/processor 240 of base station 110, controller/processor 280 of UE 120, and/or any other component(s) of FIG. 2 may perform or direct operations of, for example, process 1100 of FIG. 11 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11 and/or other processes as described herein. In some aspects, executing instructions may include running the instructions, converting the instructions, compiling the instructions, and/or interpreting the instructions, among other examples.

In some aspects, the UE 120 includes means for measuring, for a first beam group of a set of beam groups associated with the UE 120, a CBR for the first beam group; means for receiving, from a second UE, an indication of a second CBR for a second beam group associated with the second UE; and/or means for transmitting, to the second UE using a beam included in the first beam group, a signal using one or more transmit parameters that are based at least in part on at least one of the first CBR or the second CBR. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving, from the second UE or one or more other UEs, using the beam or another beam included in the first beam group, an indication of a number of resources that have been used or are to be used by the second UE or the one or more other UEs to receive signals; and/or means for determining the first CBR for the first beam group based at least in part on the number of resources that have been used or are to be used by the second UE or the one or more other UEs to receive signals.

In some aspects, the UE 120 includes means for receiving the indication via at least one of an announcement message or a physical sidelink feedback channel signal.

In some aspects, the UE 120 includes means for determining the one or more transmit parameters based at least in part on at least one of the first CBR or the second CBR.

In some aspects, the UE 120 includes means for determining a highest CBR among the first CBR and the second CBR; and/or means for determining the one or more transmit parameters based at least in part on the highest CBR.

In some aspects, the UE 120 includes means for determining a first transmit parameter included in the one or more transmit parameters based at least in part on the first CBR; and/or means for determining a second transmit parameter included in the one or more transmit parameters based at least in part on the second CBR.

In some aspects, the UE 120 includes means for receiving, from a third UE, an indication of a third CBR for a third beam group associated with the third UE; and/or means for transmitting, to the third UE using a beam included in the first beam group, a different signal using one or more transmit parameters that are based at least in part on at least one of the first CBR or the third CBR.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
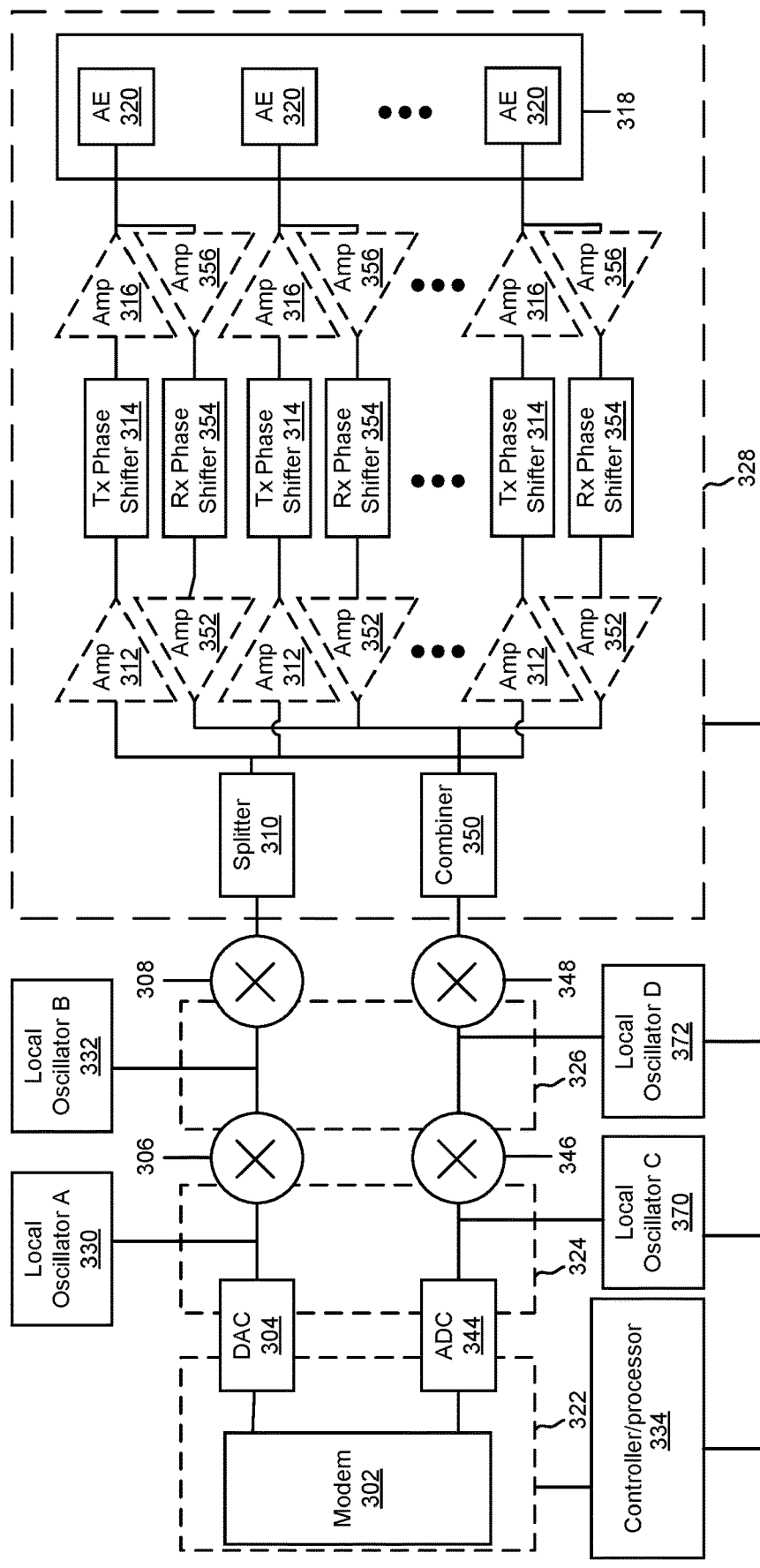
FIG. 3 is a diagram illustrating an example beamforming architecture that supports beamforming for communications.

FIG. 3 is a diagram illustrating an example beamforming architecture 300 that supports beamforming for communications. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
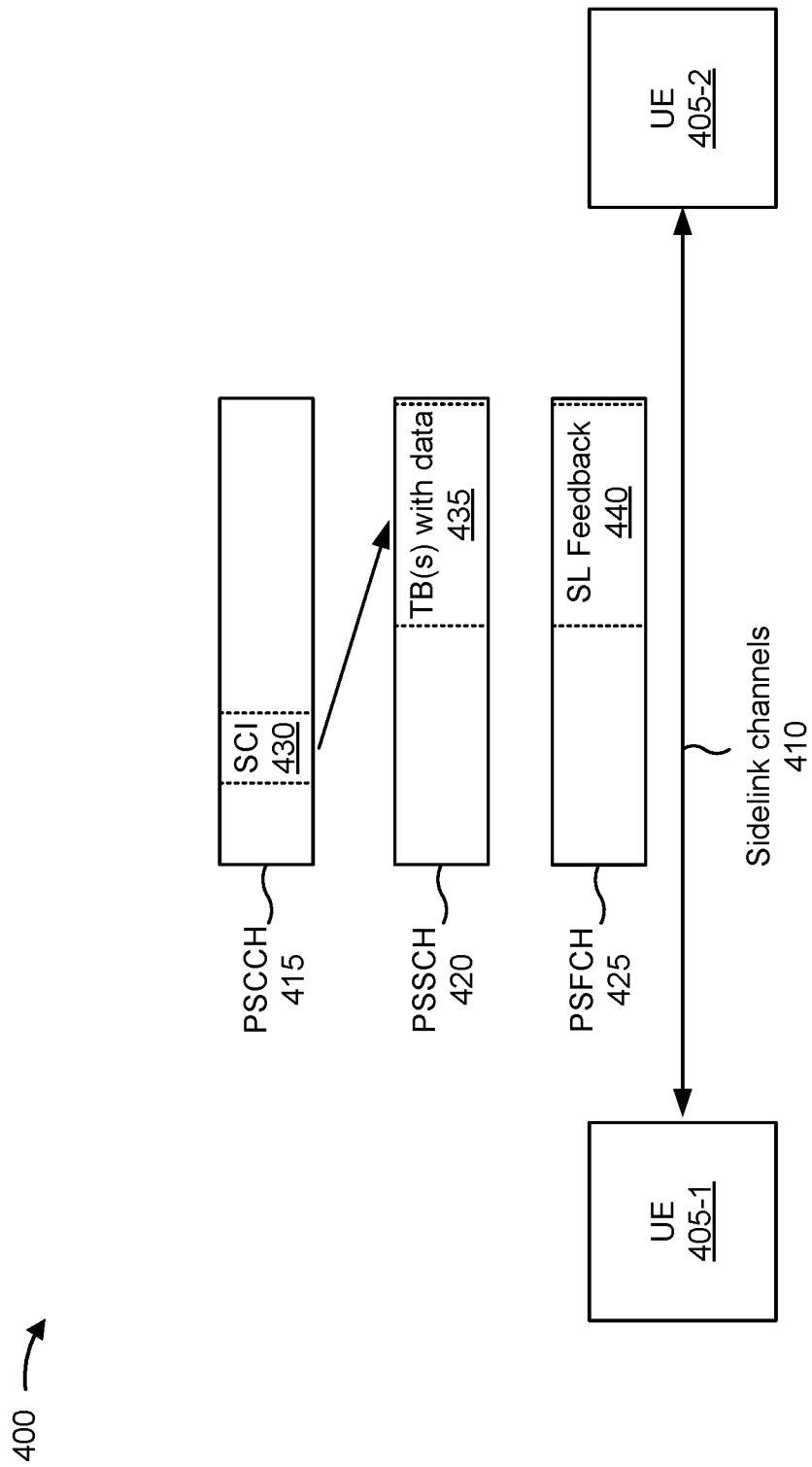
FIG. 4 is a diagram illustrating an example of sidelink communications.

FIG. 4 is a diagram illustrating an example 400 of sidelink communications. As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, vehicle-to-pedestrian (V2P) communications, and/or the like), mesh networking, and/or the like. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, symbols, and/or the like) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, spatial resources, and/or the like) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a transmission mode where resource selection and/or scheduling is performed by the UE 405 (e.g., rather than a base station 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources, channel parameters, and/or the like. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, a modulation and coding scheme (MCS) to be used for the upcoming sidelink transmission, and/or the like. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
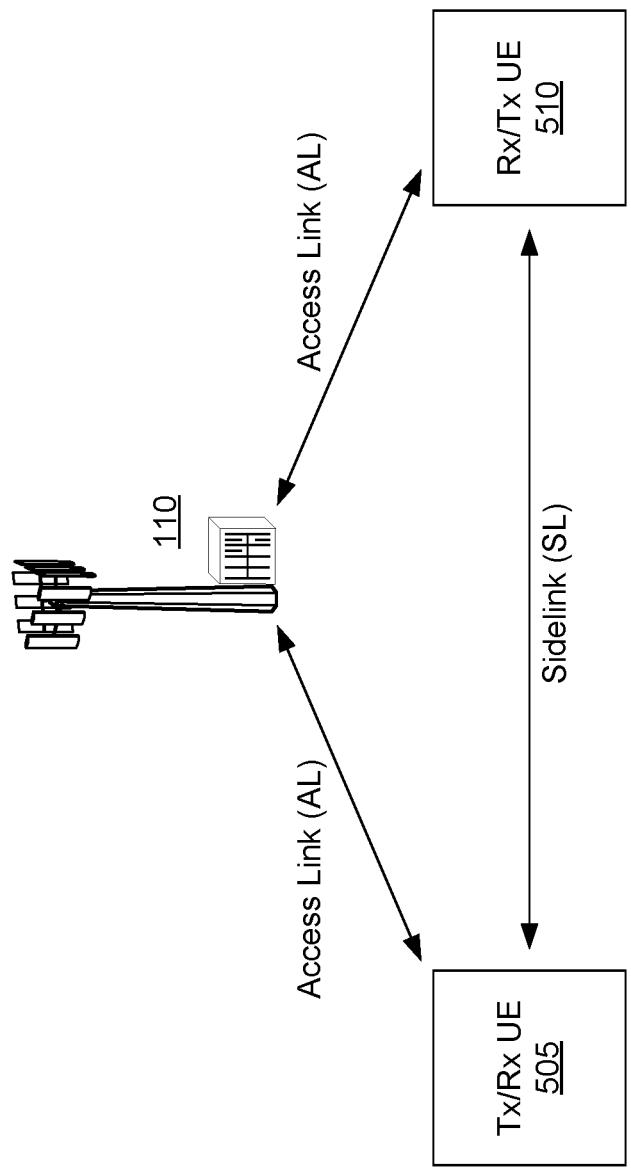
FIG. 5 is a diagram illustrating an example of sidelink communications and access link communications.

FIG. 5 is a diagram illustrating an example 500 of sidelink communications and access link communications. As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

Figure 6:
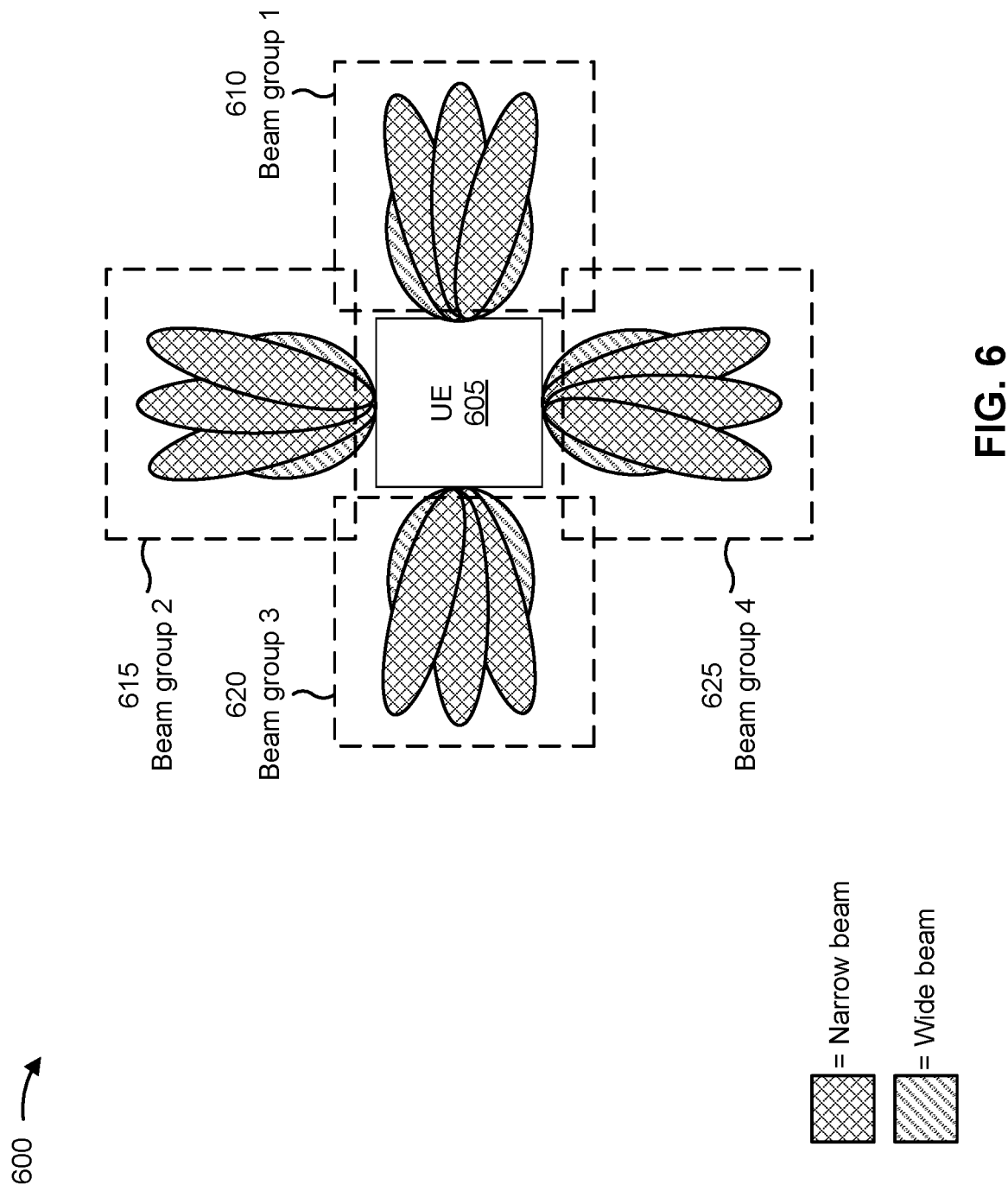
FIG. 6 is a diagram illustrating an example of beam groups.

FIG. 6 is a diagram illustrating an example 600 of beam groups. As shown in FIG. 6, a UE 605 may communicate (e.g., transmit and/or receive) using different beams that are associated with different spatial directions. The beams may be associated with different shapes (such as the amplitudes, widths, and/or presence of side lobes) and directions (such as an angle of the beam relative to a surface of an antenna array), as described above in connection with FIG. 3. For example, as shown in FIG. 6, the UE 605 may be capable of forming wide beams and/or narrow beams. The wide beams may be associated with a relatively large width. In some aspects, a wide beam may be a beam that has not been refined and/or a beam that is associated with a low beamforming gain, among other examples. A narrow beam may be associated with a relatively narrow width. For example, a narrow beam may be a beam that has been refined and/or a beam that is associated with a high beamforming gain, among other examples. Although the narrow beams shown in FIG. 6 have similar widths, there may be various levels of narrow beams having different widths (e.g., different levels of beam refinement).

As shown in FIG. 6, the UE 605 may be capable of forming beams in different spatial directions. The UE 605 may group or associate beams that have a similar spatial direction (e.g., a similar angle relative to a surface of an antenna array) into a beam group. A beam group may include one or more beams. In some aspects, a beam group may include one or more wide beams and/or one or more narrow beams. For example, as shown by reference number 610, a first beam group (e.g., beam group 1) of the UE 605 may include 3 narrow beams and 1 wide beam that each have a similar spatial direction (e.g., to the east of UE 605). As shown by reference number 615, a second beam group (e.g., beam group 2) of the UE 605 may include 3 narrow beams and 1 wide beam that each have a similar spatial direction (e.g., to the north of UE 605). As shown by reference number 620, a third beam group (e.g., beam group 3) of the UE 605 may include 3 narrow beams and 1 wide beam that each have a similar spatial direction (e.g., to the west of UE 605). As shown by reference number 625, a fourth beam group (e.g., beam group 4) of the UE 605 may include 3 narrow beams and 1 wide beam that each have a similar spatial direction (e.g., to the south of UE 605). The beam groups shown in FIG. 6 are provided as examples. As described above, a beam group may include one beam or multiple beams, only narrow beam(s), only wide beam(s), and/or both wide and narrow beams, among other examples.

As indicated above, FIG. 6 is provided as an example. Other examples may differ from what is described with respect to FIG. 6.

Figure 7:
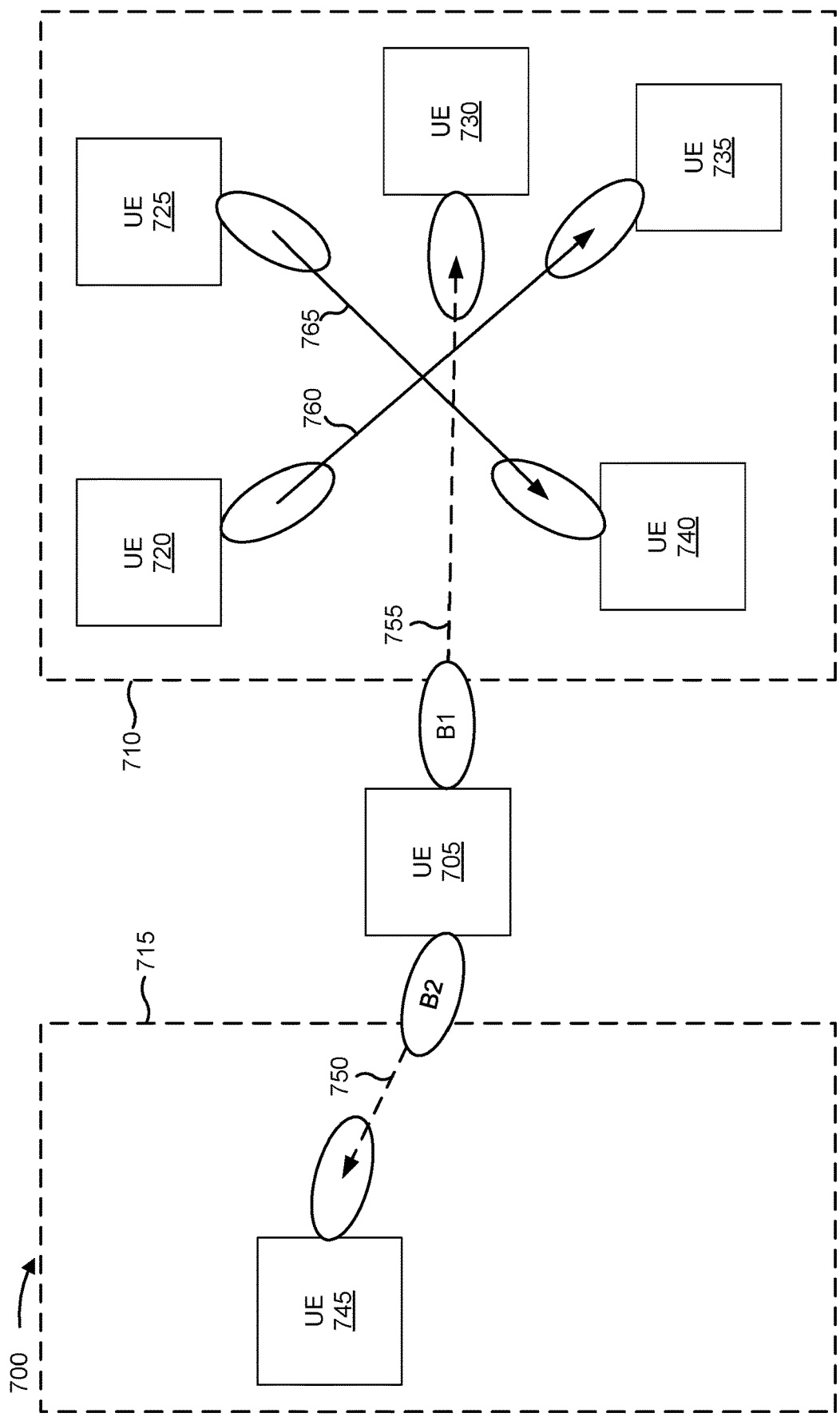
FIG. 7 is a diagram illustrating an example of a sidelink communication network.

FIG. 7 is a diagram illustrating an example 700 of a sidelink communication network. As shown in FIG. 7, the sidelink communication network may include a UE 705. The UE 705 may be a transmit (Tx) UE. As used herein, "transmit UE" or "Tx UE" may refer to a UE that is to transmit a sidelink communication in connection with the example being described. Similarly, as used herein "receive UE" or "Rx UE" may refer to a UE that is to receive a sidelink communication in connection with the example being described. For example, in other scenarios, a "Tx UE" may receive communications in a similar manner as an Rx UE as described herein. Similarly, an "Rx UE" may transmit communications in a similar manner as a Tx UE as described herein.

As shown in FIG. 7, the sidelink communication network may include a first portion shown by reference number 710 and a second portion shown by reference number 715. The first portion may include a UE 720, a UE 725, a UE 730, a UE 735, and a UE 740. The second portion may include a UE 745. The UE 705 may be capable of transmitting a sidelink communication using a first beam (e.g., B1) to the UE 730 in the first portion of the sidelink communication network, as shown by reference number 755. Additionally, or alternatively, the UE 705 may be capable of transmitting a sidelink communication using a second beam (e.g., B2) to the UE 745 in the second portion of the sidelink communication network, as shown by reference number 750.

Generally, if a channel to be used for a sidelink communication is busy, then the sidelink communication may cause interference with or may collide with another transmission on the channel Thus, when a Tx UE (e.g., UE 705) needs to transmit a sidelink communication to an Rx UE (e.g., UE 730 and/or UE 745), the Tx UE should take into consideration how busy the channel is when determining when/whether to transmit the sidelink communication on the sidelink channel. In order to achieve this, the Tx UE may be configured to monitor a CBR associated with the sidelink channel A CBR is a measurement indicative of how busy a channel is and, therefore, may indicate a probability of interference or a collision with another transmission on the channel. For example, a CBR may be approximately equal to a number of resources that a UE detects being used on the channel, divided by a total number of available resources on the channel A relatively high CBR may indicate that the channel is being frequently used for transmissions, meaning that a probability of interference or collision is relatively high. A relatively low CBR may indicate that the channel is not being used frequently, meaning that a probability of interference or collision is relatively low.

The CBR may be defined, or otherwise fixed, by a wireless communication standard, such as a 3GPP Specification. However, in prior wireless communication systems in which CBR-based techniques have been implemented, such as a Long Term Evolution (LTE) V2X system, a CBR is defined but does not address the concept of beamforming. Thus, in a system that uses beamforming (e.g., an NR system that uses millimeter wave (mmW) communications) the conventional approach to using CBR may be insufficient for assessing channel use.

For example, as described above, the UE 705 may be capable of transmitting into the first portion of the sidelink communication network or the second portion of the wireless communication network. As shown in FIG. 7, the first portion of the sidelink communication network may be congested and include multiple UEs transmitting on a channel. For example, as shown by reference number 760, the UE 720 may be transmitting a sidelink communication to the UE 735. Similarly, as shown by reference number 765, the UE 725 may transmit a sidelink communication to the UE 740. Therefore, the first portion of the sidelink communication network may be relatively busy and may have a relatively high probability of interference or collision. Conversely, the second portion of the sidelink communication network may only include the UE 745 and may not have any other UEs transmitting on the sidelink channel Therefore, the second portion of the sidelink communication network may have a relatively low probability of interference or collision.

However, as described above, the UE 705 may be unable to determine different CBRs for the first beam (e.g., B1 transmitting into the first portion of the sidelink communication network), and for the second beam (e.g., B2 transmitting into the second portion of the sidelink communication network) to differentiate between the busy portion of the sidelink communication network (e.g., the first portion of the sidelink communication network) and the idle portion of the sidelink communication network (e.g., the second portion of the sidelink communication network). As a result, a communication performance of the UE 705 may be degraded, as the UE 705 may use transmit parameters that cause interference or collision with other communications (e.g., in the busy part of the sidelink communication network) or that are not optimized (e.g., for the idle part of the sidelink communication network).

Some techniques and apparatuses described herein enable a beamformed CBR. For example, a Tx UE may measure a first CBR (e.g., a Tx CBR) using a beam that is to be used for transmitting a sidelink communication. An Rx UE may measure a second CBR (e.g., an Rx CBR) using a beam that is to be used for receiving the sidelink communication. The Rx UE may transmit an indication of the Rx CBR to the Tx UE. The Tx UE may use the Tx CBR and/or the Rx CBR to determine one or more transmit parameters for the sidelink communication. A transmit parameter may include a number of HARQ retransmissions for the sidelink communication, a number of subchannels to be used by the Tx UE in a slot, a modulation and coding scheme (MCS) to be used for the sidelink communication, and/or a channel occupancy ratio (CR) limit for the Tx UE, among other examples. The Tx UE may transmit the sidelink communication, using the determined one or more transmit parameters, to the Rx UE.

In some aspects, the Tx UE may measure a Tx CBR for a first beam group using one or more beams included in the first beam group. The first beam group may include the beam that is to be used for transmitting a sidelink communication. As the beam(s) included in a beam group have a similar spatial direction (e.g., as described above in connection with FIG. 6), a beam group should have a same CBR for each beam included in the beam group. Therefore, the Tx UE may measure a Tx CBR for a beam group that includes the beam that is to be used for transmitting a sidelink communication. Similarly, the Rx UE may measure an Rx CBR for a beam group that includes the beam that is to be used for receiving the sidelink communication.

As a result, the Tx UE may be enabled to use a beamformed CBR that can be used for determining transmit parameters for sidelink communications. This may enable the Tx UE to identify when the Tx UE is transmitting into a busy portion of the network (e.g., with a relatively high CBR) and use transmit parameters that reduce a likelihood or a probability of interference or collision with other transmissions. Similarly, the Tx UE may be enabled to identify when the Tx UE is transmitting into an idle portion of the network (e.g., with a relatively low CBR) and use transmit parameters that increase a communication performance of the sidelink communication.

Figure 8A:
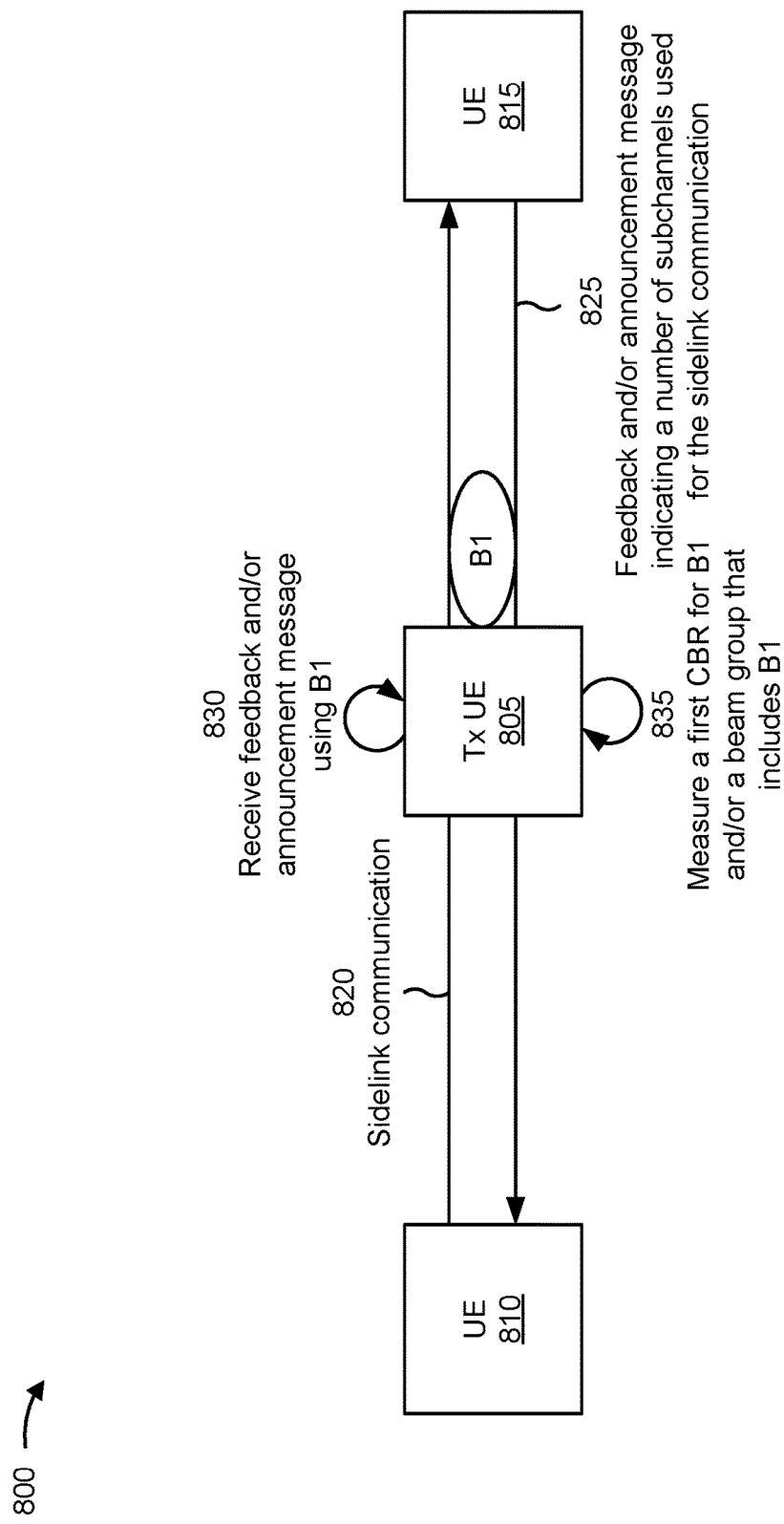
FIGS. 8A-8C are diagrams illustrating an example associated with a beamformed channel busy ratio (CBR), in accordance with various aspects of the present disclosure.
Figure 8B:
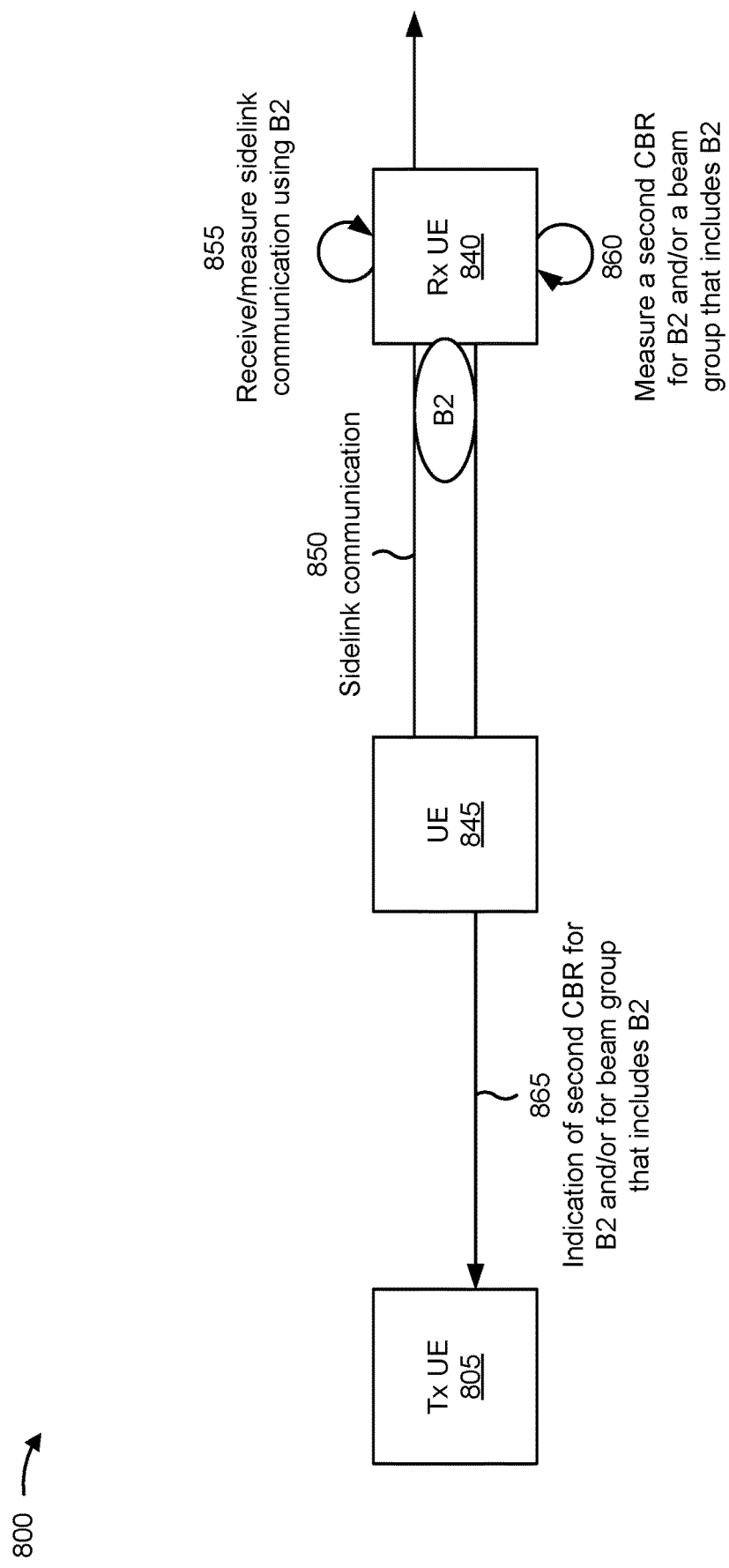
Figure 8C:
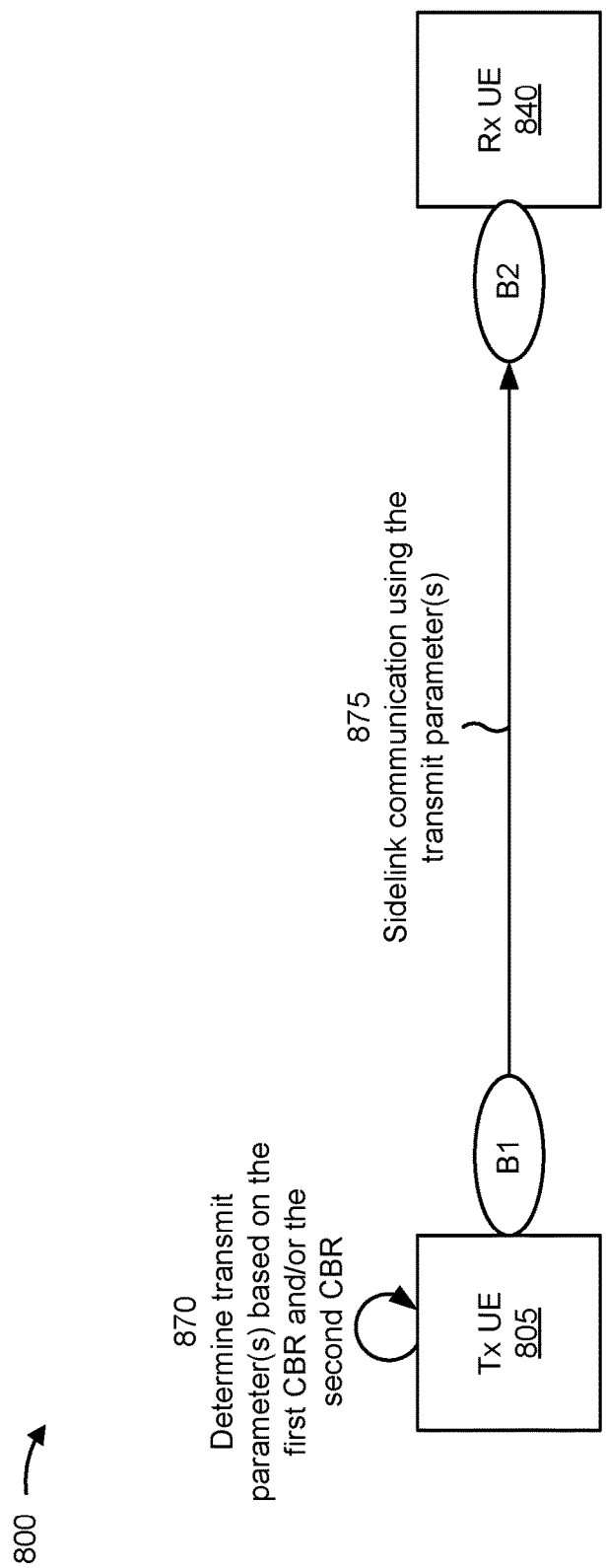

FIGS. 8A-8C are diagrams illustrating an example 800 associated with a beamformed CBR, in accordance with various aspects of the present disclosure. As shown in FIGS. 8A-8C, example 800 includes communication between one or more UEs. In some aspects, the UEs may be included in a wireless network, such as wireless network 100 or the sidelink communication network described above in connection with FIG. 7. The UEs may communicate via a wireless sidelink, as described above in connection with FIGS. 4 and/or 5.

As shown in FIG. 8A, a Tx UE 805 may be capable of transmitting a sidelink communication (e.g., a signal) using a first beam (e.g., B1 as shown in FIG. 8A). The Tx UE 805 may measure a CBR for the first beam and/or for a beam group that includes the first beam to avoid creating collisions or interference at nearby UEs, such as at a UE 815 as shown in FIG. 8A. For example, the Tx UE may measure channel use using the first beam to determine a level of the channel use (e.g., the CBR) in the spatial direction associated with the first beam.

For example, as shown by reference number 820, a UE 810 may be transmitting a sidelink communication to the UE 815. The sidelink communication transmitted by the UE 810 may be received by the UE 815. The sidelink communication may be a PSCCH signal (e.g., carrying SCI and/or resource reservation information) or may be a PSSCH signal. The UE 815 may receive and/or decode the sidelink communication transmitted by the UE 810.

As shown by reference number 825, the UE 815 may transmit, to the UE 810, a feedback communication (e.g., ACK/NACK feedback) based on receiving the sidelink communication on a PSFCH. The feedback communication may include one or more fields (e.g., one or more bits) to indicate a number of resources (e.g., a number of subchannels) used by the sidelink communication. For example, the one or more fields may be added to the feedback communication (e.g., in addition to the ACK/NACK feedback) to indicate the feedback and the number of resources (e.g., the number of subchannels) used by the sidelink communication. Additionally, or alternatively, the UE 815 may transmit or broadcast an announcement message (e.g., a receive (Rx) announcement) indicating a reservation of resources for one or more upcoming sidelink communications. For example, the sidelink communication from the UE 810 may carry SCI that reserves resources (e.g., one or more subchannels) for an upcoming sidelink communication. The UE 815 may transmit the announcement message indicating the number of resources (e.g., the number of subchannels) for the upcoming sidelink communication.

As shown by reference number 830, the Tx UE 805 may receive the feedback communication and/or the announcement message from the UE 815 using the first beam (and/or one or more other beams included in a beam group that includes the first beam). For example, as shown in FIG. 8A, the feedback communication and/or the announcement message may be transmitted to the UE 810 in a spatial direction such that the Tx UE 805 is enabled to receive the feedback communication and/or the announcement message using the first beam. This enables the Tx UE 805 to identify channel use in the spatial direction of the first beam, as described in more detail below.

As shown by reference number 835, the Tx UE 805 may measure a first CBR (e.g., a Tx CBR) for the first beam and/or for a beam group that includes the first beam (e.g., a first beam group). For example, the Tx UE 805 may identify the number of resources (e.g., the number of subchannels) used or reserved by the UE 815 based at least in part on the feedback communication and/or the announcement message. The Tx UE 805 may measure the first CBR over a measurement window. For example, the Tx UE 805 may monitor for feedback communications and/or the announcement messages using the first beam and/or using beams included in the first beam group. The Tx UE 805 may determine the number of resources (e.g., the number of subchannels) in which there were sidelink communications (e.g., PSSCH transmissions), as computed by the Tx UE 805 based at least in part on feedback communications and/or announcement messages received by the Tx UE 805 on the first beam or on beams included in the first beam group over the measurement window. The Tx UE 805 may determine the first CBR based at least in part on the number of resources (e.g., the number of subchannels) identified during the measurement window.

As a result, the Tx UE 805 is enabled to determine a channel use for nearby Rx UEs, such as UE 815. For example, if the Tx UE 805 determines a relatively high CBR for the first CBR, then the first CBR may indicate a busy channel (e.g., a high number of UEs near the Tx UE 805 (in the spatial direction of the first beam) receiving communications). If the Tx UE 805 determines a relatively low CBR for the first CBR, then the first CBR may indicate an idle channel (e.g., a low number of UEs near the Tx UE 805 (in the spatial direction of the first beam) receiving communications).

As shown in FIG. 8B, an Rx UE 840 may be the intended receiver of the sidelink communication from the Tx UE 805 (e.g., that is to be transmitted using the first beam, as described above). For example, the Rx UE 840 may intend to receive the sidelink communication from the Tx UE 805 using a second beam (e.g., B2 as shown in FIG. 8B). The second beam may be included in a beam group (e.g., a second beam group) of the Rx UE 840.

The Rx UE 805 may be configured to monitor channel use in the spatial direction of the second beam and/or the second beam group. For example, one or more UEs, such as a UE 845 as shown in FIG. 8B, may be transmitting in a spatial direction of the second beam and/or the second beam group. For example, as shown by reference number 850, the UE 845 may transmit a sidelink communication in the spatial direction of the second beam and/or the second beam group. The sidelink communication may be a PSCCH signal (e.g., carrying SCI) or a PSSCH signal. The sidelink communication may be intended for another Rx UE (not shown in FIG. 8B).

As shown by reference number 855, the Rx UE 840 may receive, detect, and/or measure the sidelink communication using the second beam and/or another beam included in the second beam group of the Rx UE 840. For example, the Rx UE 840 may measure an RSSI (e.g., a sidelink RSSI (SL-RSSI)) of the sidelink communication using the second beam and/or another beam included in the second beam group. The SL-RSSI may be defined by a wireless communication standard, such as a 3GPP Specification. For example, the SL-RSSI may be a linear average of the total received power observed in a configured subchannel in OFDM symbols of a slot configured for PSCCH and PSSCH (e.g., starting from the second OFDM symbol of the slot).

As shown by reference number 860, the Rx UE 840 may measure a second CBR (e.g., an Rx CBR) for the second beam and/or for the second beam group. For example, the Rx UE 840 may monitor for sidelink communications using the second beam and/or the second beam group to measure the SL-RSSI of the sidelink communications (e.g., in a similar manner as described above). The Rx UE 840 may measure the second CBR based at least in part on a number of subchannels associated with an SL-RSSI value that satisfies a threshold over a measurement window. The Rx UE 840 may measure the second CBR for the second beam (e.g., using measured SL-RSSI on the second beam) and/or for the second beam group (e.g., using measured SL-RSSI on any beam included in the second beam group).

As a result, the Rx UE 840 is enabled to determine a channel use in the receive direction (e.g., in the spatial direction of the second beam). For example, if the Rx UE 840 determines a relatively high CBR for the second CBR, then the second CBR may indicate that the channel is busy in the receive direction (e.g., that there is a high number of UEs transmitting in the spatial direction of the second beam). If the Rx UE 840 determines a relatively low CBR for the second CBR, then the second CBR may indicate that the channel is idle in the receive direction (e.g., that there is a low number of UEs transmitting in the spatial direction of the second beam).

As shown by reference number 865, the Rx UE 840 may transmit, and the Tx UE 805 may receive, an indication of the second CBR (e.g., the Rx CBR) for the second beam and/or for the second beam group. By transmitting the indication of the second CBR, the Tx UE 805 is enabled to identify a channel use (e.g., the second CBR) detected at the Rx UE 840 and determine transmit parameters for the sidelink communication to the Rx UE 840 based at least in part on the channel use at the Rx 840, as described in more detail below.

As shown in FIG. 8C, and by reference number 870, the Tx UE 805 may determine one or more transmit parameters, for the sidelink communication to the Rx UE 840, based at least in part on the first CBR and/or the second CBR. A transmit parameter may include a number of HARQ retransmissions for the sidelink communication, a number of subchannels to be used by the Tx UE 805 (e.g., in a slot), an MCS to be used for the sidelink communication, and/or a CR limit (e.g., for the Tx UE 805 or the Rx UE 840), among other examples.

The Tx UE 805 may use only the first CBR, only the second CBR, and/or both the first CBR and the second CBR to determine the one or more transmit parameters. For example, in some aspects, the Tx UE 805 may determine a maximum CBR between the first CBR and the second CBR (e.g., a CBR that has a higher value). The Tx UE 805 may use the maximum CBR to determine one or more transmit parameters, such as the number of HARQ retransmissions for the sidelink communication, the number of subchannels to be used by the Tx UE 805 (e.g., in a slot), and/or the MCS to be used for the sidelink communication. In some aspects, the Tx UE 805 may use the first CBR to determine a first transmit parameter (e.g., a first one or more transmit parameters) and the second CBR to determine a second transmit parameter (e.g., a second one or more transmit parameters). For example, the Tx UE 805 may use the first CBR (e.g., the Tx CBR) to determine a CR limit for the Tx UE 805, and may use the second CBR (e.g., the Rx CBR) to determine a CR limit for the Rx UE 840.

As shown by reference number 875, the Tx UE 805 may transmit, to the Rx UE 840, the sidelink communication using the one or more transmit parameters (e.g., determined by the Tx UE 805 as described above). The Tx UE 805 may transmit the sidelink communication using the first beam (e.g., B1). The Rx UE 840 may receive the sidelink communication using the second beam (e.g., B2). As a result, the Tx UE 805 may ensure that the sidelink communication has a low probability or likelihood of causing collisions and/or interference (e.g., if the first CBR and/or second CBR is a relatively high CBR, indicating a busy channel) by using a lower number of HARQ retransmissions, a lower number of subchannels, a lower order MCS, and/or a lower CR limit, among other examples. Similarly, the Tx UE 805 may improve a communication performance of the sidelink communication (e.g., if the first CBR and/or second CBR is a relatively low CBR, indicating an idle channel) by using a greater number of HARQ retransmissions, a greater number of subchannels, a higher order MCS, and/or a greater CR limit, among other examples.

Moreover, by using a beamformed CBR as described above, the Tx UE 805 may be enabled to identify when the Tx UE 805 is transmitting into a busy portion of the network (e.g., with a relatively high CBR) and use transmit parameters that reduce a likelihood or a probability of interference or collision with other transmissions. Similarly, the Tx UE 805 may be enabled to identify when the Tx UE 805 is transmitting into an idle portion of the network (e.g., with a relatively low CBR) and use transmit parameters that increase a communication performance of the sidelink communication.

As indicated above, FIGS. 8A-8C are provided as examples. Other examples may differ from what is described with respect to FIGS. 8A-8C.

Figure 9:
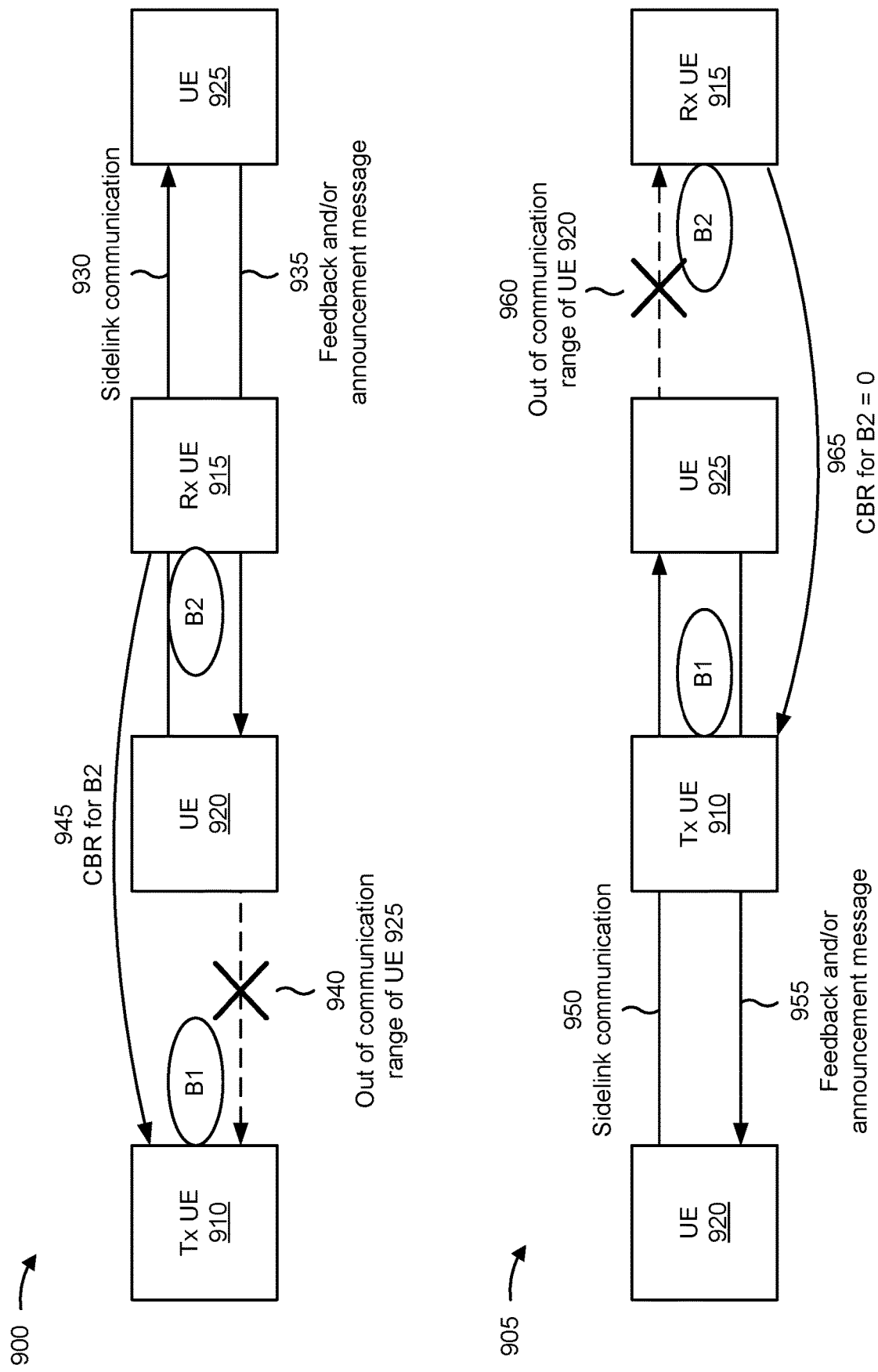
FIGS. 9 and 10 are diagrams illustrating examples associated with a beamformed CBR, in accordance with various aspects of the present disclosure.

FIG. 9 is a diagram illustrating an example 900 and an example 905 associated with a beamformed CBR, in accordance with various aspects of the present disclosure. As shown in FIG. 9, example 900 and example 905 include communication between one or more UEs. In some aspects, the UEs may be included in a wireless network, such as wireless network 100 or the sidelink communication network described above in connection with FIG. 7. The UEs may communicate via a wireless sidelink, as described above in connection with FIGS. 4 and/or 5.

Example 900 and example 905 depict examples in which a Tx UE, such as Tx UE 910, uses a beamformed CBR to determine transmit parameters in a similar (or the same) manner as described above in connection with FIGS. 8A-8C. The examples depicted in FIG. 9 show scenarios in which relying on a Tx CBR or an Rx CBR alone may be insufficient.

As shown in FIG. 9, and example 900, the Tx UE 910 may intend to transmit (e.g., using a first beam, B1) a sidelink communication to Rx UE 915. The Rx UE 915 may intend to receive the sidelink communication using a second beam (e.g., B2). As shown in FIG. 9, a UE 920 and a UE 925 may be communicating near the Rx UE 915. For example, as shown by reference number 930, the UE 920 may transmit a sidelink communication to the UE 925. The UE 925 may receive the sidelink communication.

As shown by reference number 935, the UE 925 may transmit a feedback communication and/or an announcement message, to the UE 920, that indicates a number of resources (e.g., a number of subchannels) used by the UE 925 to receive the sidelink communication (or an upcoming sidelink communication), as described above in connection with FIGS. 8A-8C. However, as shown by reference number 940, the Tx UE 910 may be out of a communication range of the UE 925. Therefore, the Tx UE 910 may not receive the feedback communication and/or the announcement message transmitted by the UE 925.

As a result, when measuring a Tx CBR for the first beam (or a beam group that includes the first beam), the Tx UE 910 may not take into account the subchannels used by the UE 920 and/or the UE 925 for the sidelink communication shown by reference number 930. Therefore, if the Tx UE 910 relied only on the Tx CBR for determining transmit parameter(s) for a sidelink communication to the Rx UE 915, then the Tx UE 910 may cause interference and/or collisions at the Rx UE 915 by failing to take into account the subchannels used by the UE 920 and/or the UE 925 for the sidelink communication (shown by reference number 930).

However, as shown by reference number 945, the Rx UE 915 may measure an Rx CBR for the second beam (or a beam group that includes the second beam) by measuring the RSSI (e.g., the SL-RSSI) of the sidelink communication shown by reference number 930 using the second beam (or another beam in the beam group that includes the second beam), as described above in connection with FIGS. 8A-8C. The Rx UE 915 may transmit, to the Tx UE 910, an indication of the measured Rx CBR for the second beam. As a result, the Tx UE 910 may take into account the subchannels used by the UE 920 and/or 925 for the sidelink communication shown by reference number 930 when determining transmit parameter(s) for the sidelink communication to the Rx UE 915. This may reduce a likelihood or probability of the sidelink communication to the Rx UE 915 causing interference and/or collisions (e.g., that may have occurred if the Tx UE 910 relied only on the Tx CBR).

As shown in FIG. 9, and example 905, the Tx UE 910 may intend to transmit (e.g., using a first beam, B1) a sidelink communication to Rx UE 915. The Rx UE 915 may intend to receive the sidelink communication using a second beam (e.g., B2). As shown in FIG. 9, the UE 920 and the UE 925 may be communicating near the Tx UE 910. For example, as shown by reference number 950, the UE 920 may transmit a sidelink communication to the UE 925. The UE 925 may receive the sidelink communication.

As shown by reference number 955, the UE 925 may transmit a feedback communication and/or an announcement message, to the UE 920, that indicates a number of resources (e.g., a number of subchannels) used by the UE 925 to receive the sidelink communication (or an upcoming sidelink communication), as described above in connection with FIGS. 8A-8C. The Tx UE 910 may receive the feedback communication and/or the announcement message using the first beam (or another beam included in the beam group that includes the first beam) to measure a Tx CBR, as described above in connection with FIGS. 8A-8C.

As shown by reference number 960, the Rx UE 915 may be out of a communication range of the UE 920. As a result, the Rx UE 915 may not measure the sidelink communication (shown by reference number 950) when measuring the Rx CBR of the second beam (and/or the beam group that includes the second beam). As a result, as shown by reference number 965, the Rx UE 915 may report a low Rx CBR (e.g., approximately or close to zero) for the second beam (and/or the beam group that includes the second beam), as the Rx UE 915 is unable to measure the sidelink communication (shown by reference number 950) transmitted by the UE 920.

Therefore, if the Tx UE 910 were to rely only on the Rx CBR reported by the Rx UE 915 for determining transmit parameter(s) for a sidelink communication to the Rx UE 915, then the Tx UE 910 may cause interference and/or collisions at the UE 925 by failing to take into account the subchannels used by the UE 920 and/or the UE 925 for the sidelink communication (shown by reference number 930). However, as described above, the Tx UE 910 may be enabled to rely on the Tx CBR to consider the subchannels used by the UE 920 and/or 925 for the sidelink communication (shown by reference number 930). Therefore, the transmit parameter(s) for the sidelink communication to the Rx UE 915 (e.g., determined by the Tx UE 910 as described above in connection with FIGS. 8A-8C) may take into account the subchannels used by the UE 920 and/or the UE 925 for the sidelink communication (shown by reference number 930). As a result, a likelihood or probability of the sidelink communication to the Rx UE 915 causing interference and/or collisions (e.g., that may have occurred if the Tx UE 910 relied only on the Rx CBR) may be reduced.

As indicated above, FIG. 9 is provided as an example. Other examples may differ from what is described with respect to FIG. 9.

Figure 10:
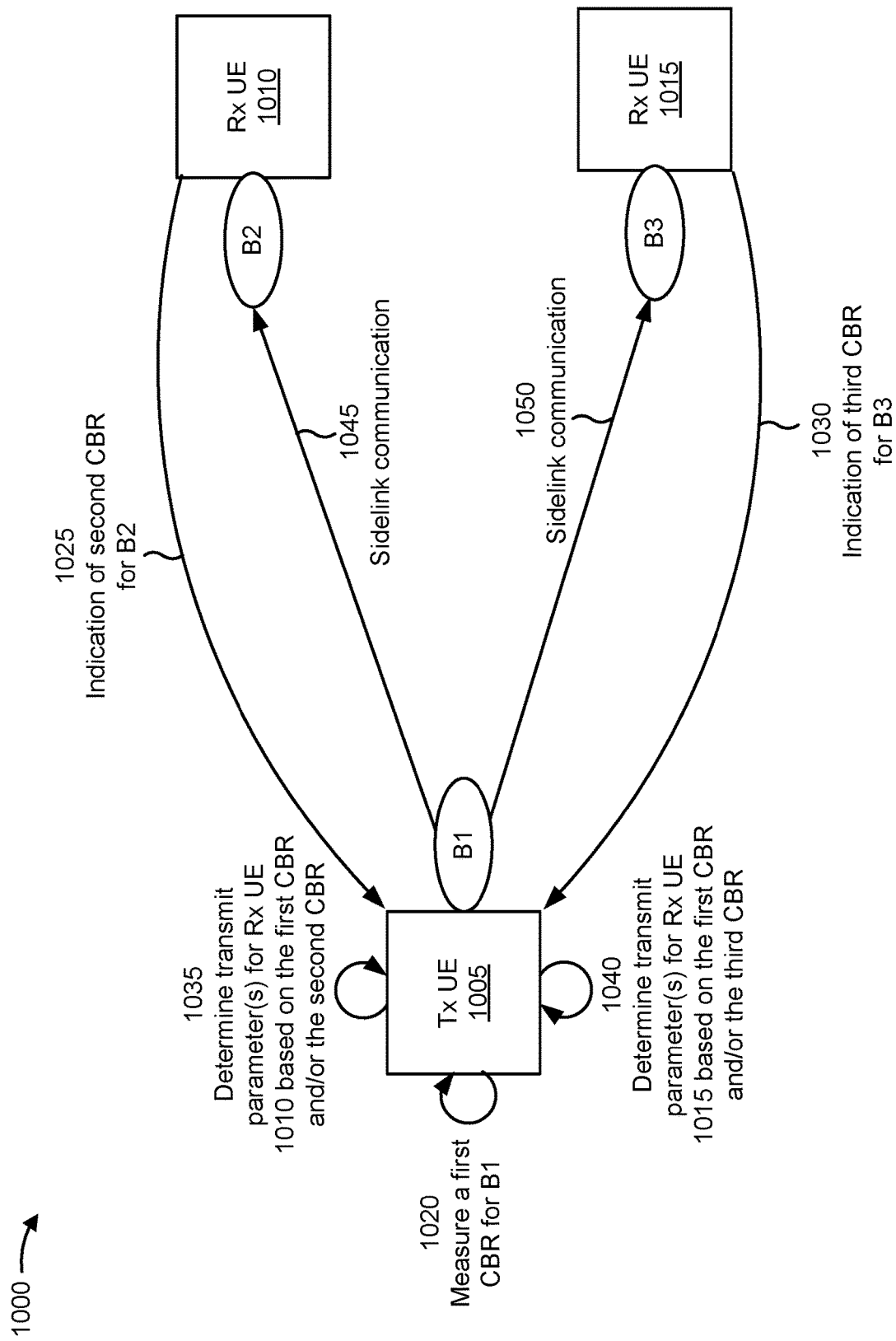

FIG. 10 is a diagram illustrating an example 1000 associated with a beamformed CBR, in accordance with various aspects of the present disclosure. As shown in FIG. 10, example 1000 includes communication between one or more UEs. In some aspects, the UEs may be included in a wireless network, such as wireless network 100 or the sidelink communication network described above in connection with FIG. 7. The UEs may communicate via a wireless sidelink, as described above in connection with FIGS. 4 and/or 5.

As shown in FIG. 10, a Tx UE 1005 may communicate, using a first beam (e.g., B1) and/or a first beam group that includes the first beam, with an Rx UE 1010 and an Rx UE 1015. The Rx UE 1010 may receive a sidelink communication from the Tx UE 1005 using a second beam (e.g., B2) and/or a second beam group that includes the second beam. The Rx UE 1015 may receive a sidelink communication from the Tx UE 1005 using a third beam (e.g., B3) and/or a third beam group that includes the third beam.

As shown by reference number 1020, the Tx UE 1005 may measure a first CBR (e.g., a Tx CBR) for the first beam and/or the first beam group. The Tx UE 1005 may measure the first CBR in a similar (or the same) manner as described above in connection with FIGS. 8A-8C and/or 9. As shown by reference number 1025, the Rx UE 1010 may transmit, to the Tx UE 1005, an indication of a second CBR (e.g., an Rx CBR) for the second beam and/or the second beam group. For example, the Rx UE 1010 may measure the second CBR in a similar (or the same) manner as described above in connection with FIGS. 8A-8C and/or 9. As shown by reference number 1030, the Rx UE 1015 may transmit, to the Tx UE 1005, an indication of a third CBR (e.g., an Rx CBR) for the third beam and/or the third beam group. For example, the Rx UE 1015 may measure the third CBR in a similar (or the same) manner as described above in connection with FIGS. 8A-8C and/or 9.

As shown by reference number 1035, the Tx UE 1005 may determine a first set of one or more transmit parameters for a sidelink communication to the Rx UE 1010 based at least in part on the first CBR (e.g., the Tx CBR) and/or the second CBR (e.g., the Rx CBR reported by the Rx UE 1010). For example, the Tx UE 1005 may determine the first set of one or more transmit parameters for the sidelink communication to the Rx UE 1010 in a similar (or the same) manner as described above in connection with FIGS. 8A-8C and/or 9.

As shown by reference number 1040, the Tx UE 1005 may determine a second set of one or more transmit parameters for a sidelink communication to the Rx UE 1015 based at least in part on the first CBR (e.g., the Tx CBR) and/or the second CBR (e.g., the Rx CBR reported by the Rx UE 1015). For example, the Tx UE 1005 may determine the second set of one or more transmit parameters for the sidelink communication to the Rx UE 1015 in a similar (or the same) manner as described above in connection with FIGS. 8A-8C and/or 9.

As shown by reference number 1045, the Tx UE 1005 may transmit, to the Rx UE 1010, a sidelink communication that uses the first set of one or more transmit parameters. As a result, the sidelink communication to the Rx UE 1010 may take into account the Tx CBR measured at the Tx UE 1005 (e.g., the Tx CBR of the first beam and/or the first beam group) and the Rx CBR measured at the Rx UE 1010 (e.g., the Rx CBR of the second beam and/or the second beam group).

As shown by reference number 1050, the Tx UE 1005 may transmit, to the Rx UE 1015, a sidelink communication that uses the second set of one or more transmit parameters. As a result, the sidelink communication to the Rx UE 1015 may take into account the Tx CBR measured at the Tx UE 1005 (e.g., the Tx CBR of the first beam and/or the first beam group) and the Rx CBR measured at the Rx UE 1015 (e.g., the Rx CBR of the third beam and/or the third beam group). Therefore, the Tx UE 1005 may be enabled to differentiate between channel use detected at the Rx UE 1010 and channel use detected at the Rx UE 1015, while also considering the channel use detected at the Tx UE 1005.

This may improve a communication performance of the sidelink communication to the Rx UE 1010 (shown by reference number 1045) and/or of the sidelink communication to the Rx UE 1015 (shown by reference number 1050).

Figure 11:
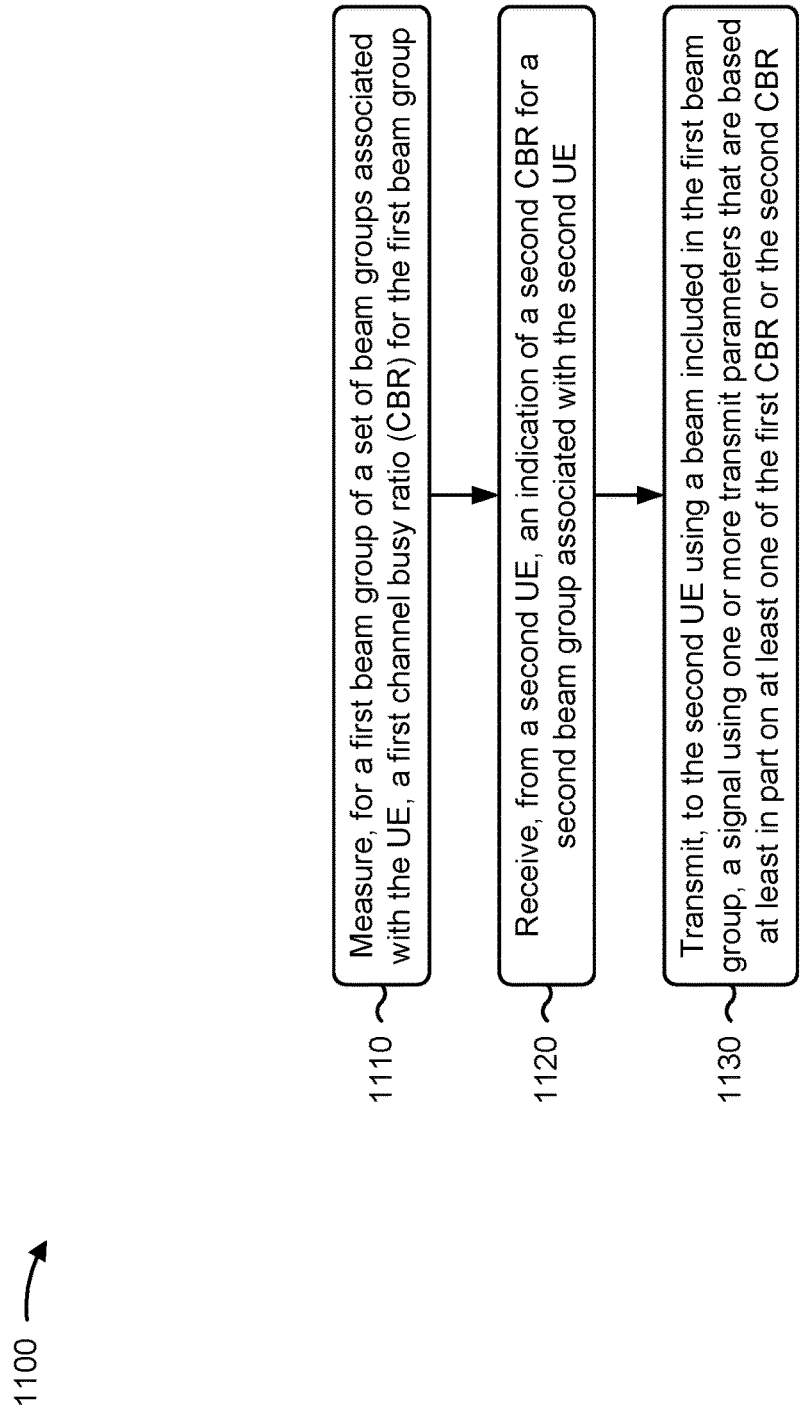
FIG. 11 is a diagram illustrating an example process associated with a beamformed CBR, in accordance with various aspects of the present disclosure.

FIG. 11 is a diagram illustrating an example process 1100 performed, for example, by a UE, in accordance with various aspects of the present disclosure. Example process 1100 is an example where the UE (e.g., UE 120, Tx UE 805, Tx UE 910, and/or Tx UE 1005) performs operations associated with a beamformed CBR.

As shown in FIG. 11, in some aspects, process 1100 may include measuring, for a first beam group of a set of beam groups associated with the UE, a first CBR for the first beam group (block 1110). For example, the UE (e.g., using CBR measurement component 1208, depicted in FIG. 12) may measure, for a first beam group of a set of beam groups associated with the UE, a first CBR for the first beam group, as described above.

As further shown in FIG. 11, in some aspects, process 1100 may include receiving, from a second UE, an indication of a second CBR for a second beam group associated with the second UE (block 1120). For example, the UE (e.g., using reception component 1202, depicted in FIG. 12) may receive, from a second UE, an indication of a second CBR for a second beam group associated with the second UE, as described above.

As further shown in FIG. 11, in some aspects, process 1100 may include transmitting, to the second UE using a beam included in the first beam group, a signal using one or more transmit parameters that are based at least in part on at least one of the first CBR or the second CBR (block 1130). For example, the UE (e.g., using transmission component 1204, depicted in FIG. 12) may transmit, to the second UE using a beam included in the first beam group, a signal using one or more transmit parameters that are based at least in part on at least one of the first CBR or the second CBR, as described above.

Process 1100 may include additional aspects, such as any single aspect or any combination of aspects described below and/or in connection with one or more other processes described elsewhere herein.

In a first aspect, measuring the first CBR for the first beam group includes receiving, from the second UE or one or more other UEs, using the beam or another beam included in the first beam group, an indication of a number of resources that have been used or are to be used by the second UE or the one or more other UEs to receive signals, and determining the first CBR for the first beam group based at least in part on the number of resources that have been used or are to be used by the second UE or the one or more other UEs to receive signals.

In a second aspect, alone or in combination with the first aspect, receiving the indication of the number of resources that have been used or are to be used by the second UE or the one or more other UEs to receive signals includes receiving the indication via at least one of an announcement message or a physical sidelink feedback channel signal.

In a third aspect, alone or in combination with one or more of the first and second aspects, the second CBR is based at least in part on a measurement of a physical sidelink shared channel signal or a physical sidelink control channel signal performed by the second UE using one or more beams included in the second beam group.

In a fourth aspect, alone or in combination with one or more of the first through third aspects, the second beam group includes a receive beam that the second UE is to use to receive the signal from the UE.

In a fifth aspect, alone or in combination with one or more of the first through fourth aspects, process 1100 includes determining the one or more transmit parameters based at least in part on at least one of the first CBR or the second CBR.

In a sixth aspect, alone or in combination with the fifth aspect, determining the one or more transmit parameters based at least in part on at least one of the first CBR or the second CBR includes determining a highest CBR among the first CBR and the second CBR, and determining the one or more transmit parameters based at least in part on the highest CBR.

In a seventh aspect, alone or in combination with the fifth aspect, determining the one or more transmit parameters based at least in part on at least one of the first CBR or the second CBR includes determining a first transmit parameter included in the one or more transmit parameters based at least in part on the first CBR, and determining a second transmit parameter included in the one or more transmit parameters based at least in part on the second CBR.

In an eighth aspect, alone or in combination with one or more of the first through seventh aspects, process 1100 includes receiving, from a third UE, an indication of a third CBR for a third beam group associated with the third UE, and transmitting, to the third UE using a beam included in the first beam group, a different signal using one or more transmit parameters that are based at least in part on at least one of the first CBR or the third CBR.

In a ninth aspect, alone or in combination with one or more of the first through eighth aspects, the one or more transmit parameters include at least one of a number of hybrid automatic repeat request retransmissions, a number of subchannels to be used by the UE in a slot, a modulation and coding scheme, or a channel occupancy ratio limit.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
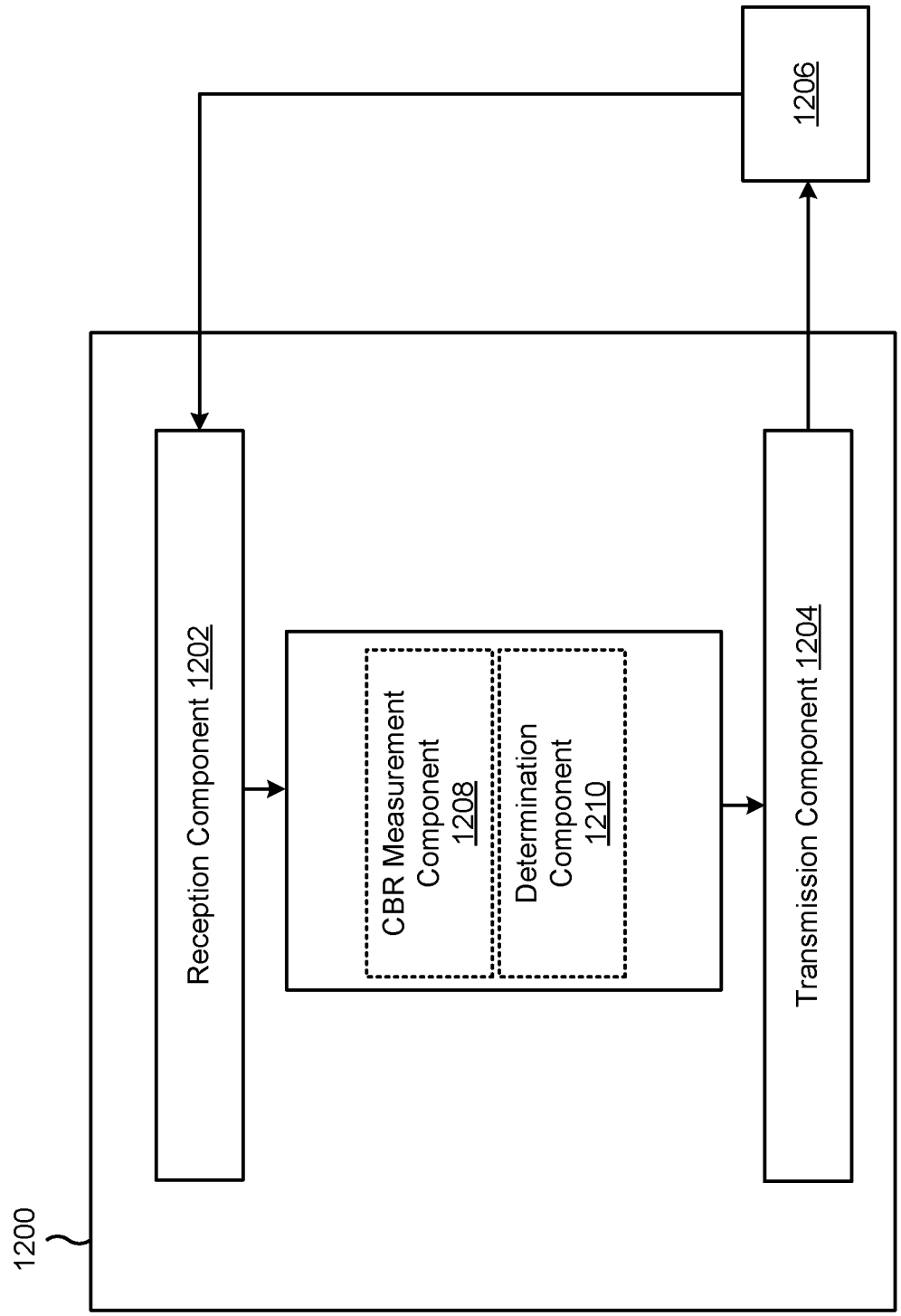
FIGS. 12 and 13 are block diagrams of example apparatuses for wireless communication, in accordance with various aspects of the present disclosure.

FIG. 12 is a block diagram of an example apparatus 1200 for wireless communication. The apparatus 1200 may be a UE (e.g., a Tx UE as described herein), or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a CBR measurement component 1208, or a determination component 1210, among other examples.

In some aspects, the apparatus 1200 may be configured to perform one or more operations described herein in connection with FIGS. 8A, 8B, 8C, 9, and/or 10. Additionally, or alternatively, the apparatus 1200 may be configured to perform one or more processes described herein, such as process 1100 of FIG. 11, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The CBR measurement component 1208 may measure, for a first beam group of a set of beam groups associated with the UE, a first CBR for the first beam group. The reception component 1202 may receive, from a second UE, an indication of a second CBR for a second beam group associated with the second UE. The transmission component 1204 may transmit, to the second UE using a beam included in the first beam group, a signal using one or more transmit parameters that are based at least in part on at least one of the first CBR or the second CBR.

The reception component 1202 may receive, from the second UE or one or more other UEs, using the beam or another beam included in the first beam group, an indication of a number of resources that have been used or are to be used by the second UE or the one or more other UEs to receive signals. The CBR measurement component 1208 may determine the first CBR for the first beam group based at least in part on the number of resources that have been used or are to be used by the second UE or the one or more other UEs to receive signals. The reception component 1202 may receive the indication via at least one of an announcement message or a physical sidelink feedback channel signal.

The determination component 1210 may determine the one or more transmit parameters based at least in part on at least one of the first CBR or the second CBR. The determination component 1210 may determine a highest CBR among the first CBR and the second CBR. The determination component 1210 may determine the one or more transmit parameters based at least in part on the highest CBR. The determination component 1210 may determine a first transmit parameter included in the one or more transmit parameters based at least in part on the first CBR. The determination component 1210 may determine a second transmit parameter included in the one or more transmit parameters based at least in part on the second CBR.

The reception component 1202 may receive, from a third UE, an indication of a third CBR for a third beam group associated with the third UE. The transmission component 1204 may transmit, to the third UE using a beam included in the first beam group, a different signal using one or more transmit parameters that are based at least in part on at least one of the first CBR or the third CBR.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
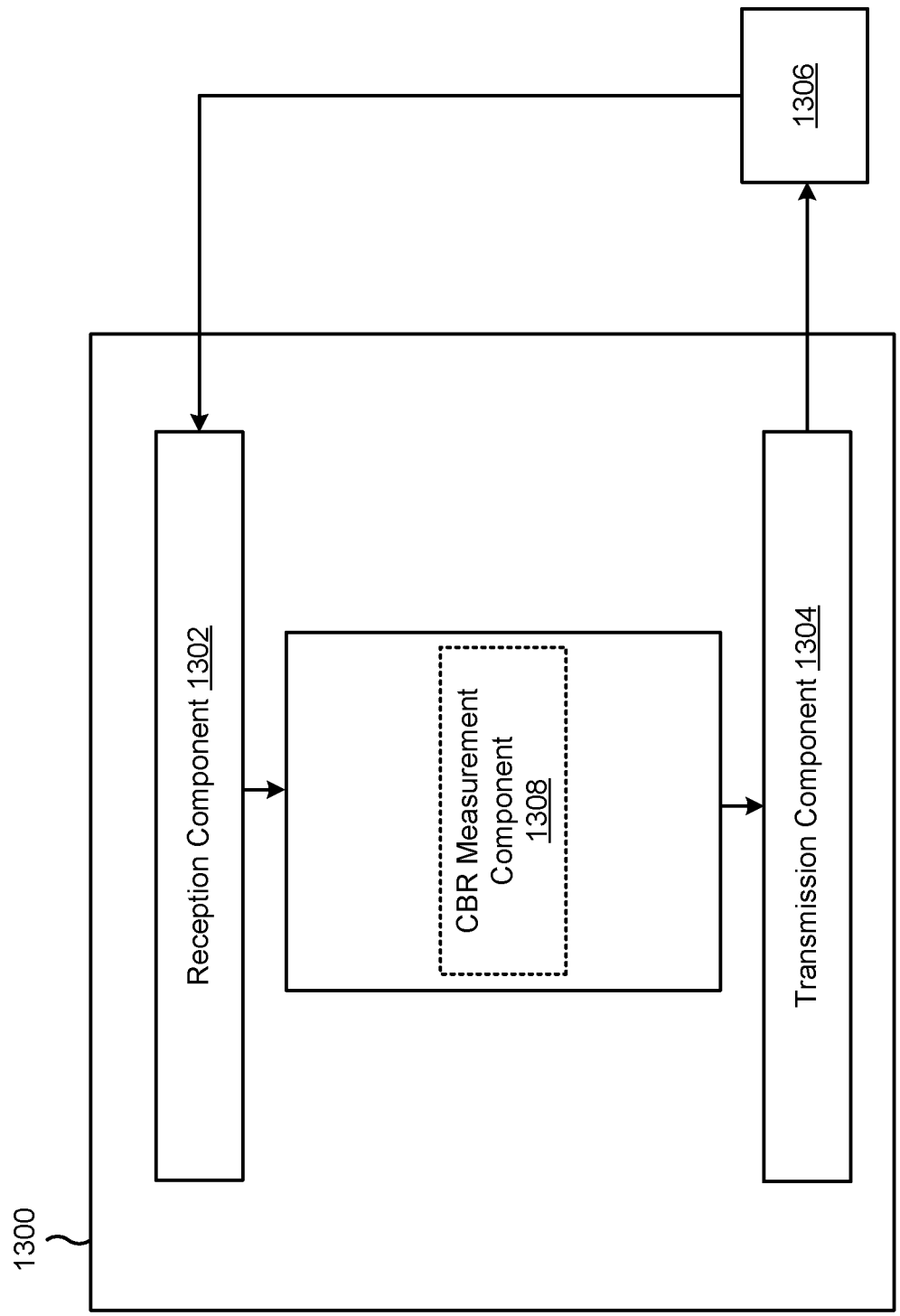

FIG. 13 is a block diagram of an example apparatus 1300 for wireless communication. The apparatus 1300 may be a UE (e.g., an Rx UE, as described herein), or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a CBR measurement component 1308, among other examples.

In some aspects, the apparatus 1300 may be configured to perform one or more operations described herein in connection with FIGS. 8A, 8B, 8C, 9, and/or 10. Additionally, or alternatively, the apparatus 1300 may be configured to perform one or more processes described herein, or a combination thereof. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The CBR measurement component 1308 may measure, for a first beam group of a set of beam groups associated with the UE, a first CBR for the first beam group. The transmission component 1304 may transmit, to a second UE, an indication of the first CBR for the first beam group. The reception component 1302 may receive, from the second UE using a beam included in a second beam group, a signal that uses one or more transmit parameters that are based at least in part on at least one of the first CBR or a second CBR for the second beam group.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some aspects of the present disclosure:

Aspect 1: A method of wireless communication performed by a user equipment (UE), comprising: measuring, for a first beam group of a set of beam groups associated with the UE, a first channel busy ratio (CBR) for the first beam group; receiving, from a second UE, an indication of a second CBR for a second beam group associated with the second UE; and transmitting, to the second UE using a beam included in the first beam group, a signal using one or more transmit parameters that are based at least in part on at least one of the first CBR or the second CBR.

Aspect 2: The method of aspect 1, wherein measuring the first CBR for the first beam group comprises: receiving, from the second UE or one or more other UEs, using the beam or another beam included in the first beam group, an indication of a number of resources that have been used or are to be used by the second UE or the one or more other UEs to receive signals; and determining the first CBR for the first beam group based at least in part on the number of resources that have been used or are to be used by the second UE or the one or more other UEs to receive signals.

Aspect 3: The method of aspect 2, wherein receiving the indication of the number of resources that have been used or are to be used by the second UE or the one or more other UEs to receive signals comprises: receiving the indication via at least one of an announcement message or a physical sidelink feedback channel signal.

Aspect 4: The method of any of aspects 1-3, wherein the second CBR is based at least in part on a measurement of a physical sidelink shared channel signal or a physical sidelink control channel signal performed by the second UE using one or more beams included in the second beam group.

Aspect 5: The method of any of aspects 1-4, wherein second beam group includes a receive beam that the second UE is to use to receive the signal from the UE.

Aspect 6: The method of any of aspects 1-5, further comprising: determining the one or more transmit parameters based at least in part on at least one of the first CBR or the second CBR.

Aspect 7: The method of aspect 6, wherein determining the one or more transmit parameters based at least in part on at least one of the first CBR or the second CBR comprises: determining a highest CBR among the first CBR and the second CBR; and determining the one or more transmit parameters based at least in part on the highest CBR.

Aspect 8: The method of aspect 6, wherein determining the one or more transmit parameters based at least in part on at least one of the first CBR or the second CBR comprises: determining a first transmit parameter included in the one or more transmit parameters based at least in part on the first CBR; and determining a second transmit parameter included in the one or more transmit parameters based at least in part on the second CBR.

Aspect 9: The method of any of aspects 1-8, further comprising: receiving, from a third UE, an indication of a third CBR for a third beam group associated with the third UE; and transmitting, to the third UE using a beam included in the first beam group, a different signal using one or more transmit parameters that are based at least in part on at least one of the first CBR or the third CBR.

Aspect 10: The method of any of aspects 1-9, wherein the one or more transmit parameters include at least one of: a number of hybrid automatic repeat request retransmissions, a number of subchannels to be used by the UE in a slot, a modulation and coding scheme, or a channel occupancy ratio limit.

Aspect 11: An apparatus for wireless communication at a device, comprising a processor; memory coupled with the processor; and instructions stored in the memory and executable by the processor to cause the apparatus to perform the method of one or more aspects of aspects 1-10.

Aspect 12: A device for wireless communication, comprising a memory and one or more processors coupled to the memory, the memory and the one or more processors configured to perform the method of one or more aspects of aspects 1-10.

Aspect 13: An apparatus for wireless communication, comprising at least one means for performing the method of one or more aspects of aspects 1-10.

Aspect 14: A non-transitory computer-readable medium storing code for wireless communication, the code comprising instructions executable by a processor to perform the method of one or more aspects of aspects 1-10.

Aspect 15: A non-transitory computer-readable medium storing a set of instructions for wireless communication, the set of instructions comprising one or more instructions that, when executed by one or more processors of a device, cause the device to perform the method of one or more aspects of aspects 1-10.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    one or more memories; and
    one or more processors coupled to the one or more memories, the one or more processors configured to:
        measure, for a first beam group of a set of beam groups associated with the UE, a first channel busy ratio (CBR) for the first beam group;
        receive, from a second UE, an indication of a second CBR that is based at least in part on a measurement performed by the second UE, the second CBR being for a second beam group associated with the second UE; and
        transmit, to the second UE using a beam included in the first beam group, a signal using one or more transmit parameters that are based at least in part on at least one of the first CBR or the second CBR, wherein the one or more transmit parameters include at least one of:
            a number of hybrid automatic repeat request retransmissions,
            a number of subchannels to be used by the UE in a slot,
            a modulation and coding scheme, or
            a channel occupancy ratio limit.

2. The UE of claim 1, wherein the one or more processors, when measuring the first CBR for the first beam group, are configured to:
    receive, from the second UE or one or more other UEs, using the beam or another beam included in the first beam group, an indication of a number of resources that have been used or are to be used by the second UE or the one or more other UEs to receive signals; and
    determine the first CBR for the first beam group based at least in part on the number of resources that have been used or are to be used by the second UE or the one or more other UEs to receive the signals.

3. The UE of claim 2, wherein the one or more processors, when receiving the indication of the number of resources that have been used or are to be used by the second UE or the one or more other UEs to receive the signals, are configured to:
    receive the indication via at least one of an announcement message or a physical sidelink feedback channel signal.

4. The UE of claim 1, wherein the measurement is of a physical sidelink shared channel signal or a physical sidelink control channel signal and is performed by the second UE using one or more beams included in the second beam group.

5. The UE of claim 1, wherein the second beam group includes a receive beam that the second UE is to use to receive the signal from the UE.

6. The UE of claim 1, wherein the one or more processors are further configured to:
    determine the one or more transmit parameters based at least in part on at least one of the first CBR or the second CBR.

7. The UE of claim 6, wherein the one or more processors, when determining the one or more transmit parameters based at least in part on at least one of the first CBR or the second CBR, are configured to:
    determine a highest CBR among the first CBR and the second CBR; and
    determine the one or more transmit parameters based at least in part on the highest CBR.

8. The UE of claim 6, wherein the one or more processors, when determining the one or more transmit parameters based at least in part on at least one of the first CBR or the second CBR, are configured to:
    determine a first transmit parameter included in the one or more transmit parameters based at least in part on the first CBR; and
    determine a second transmit parameter included in the one or more transmit parameters based at least in part on the second CBR.

9. The UE of claim 1, wherein the one or more processors are further configured to:
    receive, from a third UE, an indication of a third CBR for a third beam group associated with the third UE; and
    transmit, to the third UE using a beam included in the first beam group, a different signal using one or more transmit parameters that are based at least in part on at least one of the first CBR or the third CBR.

10. A method of wireless communication performed by a user equipment (UE), comprising:
    measuring, for a first beam group of a set of beam groups associated with the UE, a first channel busy ratio (CBR) for the first beam group;
    receiving, from a second UE, an indication of a second CBR that is based at least in part on a measurement performed by the second UE, the second CBR being for a second beam group associated with the second UE; and
    transmitting, to the second UE using a beam included in the first beam group, a signal using one or more transmit parameters that are based at least in part on at least one of the first CBR or the second CBR, wherein the one or more transmit parameters include at least one of:
        a number of hybrid automatic repeat request retransmissions,
        a number of subchannels to be used by the UE in a slot,
        a modulation and coding scheme, or
        a channel occupancy ratio limit.

11. The method of claim 10, wherein measuring the first CBR for the first beam group comprises:
    receiving, from the second UE or one or more other UEs, using the beam or another beam included in the first beam group, an indication of a number of resources that have been used or are to be used by the second UE or the one or more other UEs to receive signals; and
    determining the first CBR for the first beam group based at least in part on the number of resources that have been used or are to be used by the second UE or the one or more other UEs to receive the signals.

12. The method of claim 11, wherein receiving the indication of the number of resources that have been used or are to be used by the second UE or the one or more other UEs to receive the signals comprises:
    receiving the indication via at least one of an announcement message or a physical sidelink feedback channel signal.

13. The method of claim 10, wherein the measurement is of a physical sidelink shared channel signal or a physical sidelink control channel signal performed by the second UE using one or more beams included in the second beam group.

14. The method of claim 10, wherein the second beam group includes a receive beam that the second UE is to use to receive the signal from the UE.

15. The method of claim 10, further comprising:
    determining the one or more transmit parameters based at least in part on at least one of the first CBR or the second CBR.

16. The method of claim 15, wherein determining the one or more transmit parameters based at least in part on at least one of the first CBR or the second CBR comprises:
    determining a highest CBR among the first CBR and the second CBR; and
    determining the one or more transmit parameters based at least in part on the highest CBR.

17. The method of claim 15, wherein determining the one or more transmit parameters based at least in part on at least one of the first CBR or the second CBR comprises:
    determining a first transmit parameter included in the one or more transmit parameters based at least in part on the first CBR; and
    determining a second transmit parameter included in the one or more transmit parameters based at least in part on the second CBR.

18. The method of claim 10, further comprising:
    receiving, from a third UE, an indication of a third CBR for a third beam group associated with the third UE; and
    transmitting, to the third UE using a beam included in the first beam group, a different signal using one or more transmit parameters that are based at least in part on at least one of the first CBR or the third CBR.

19. A non-transitory computer-readable medium storing a set of instructions for wireless communication, the set of instructions comprising:
    one or more instructions that, when executed by one or more processors of a user equipment (UE), cause the UE to:
        measure, for a first beam group of a set of beam groups associated with the UE, a first channel busy ratio (CBR) for the first beam group;
        receive, from a second UE, an indication of a second CBR that is based at least in part on a measurement performed by the second UE, the second CBR being for a second beam group associated with the second UE; and
        transmit, to the second UE using a beam included in the first beam group, a signal using one or more transmit parameters that are based at least in part on at least one of the first CBR or the second CBR, wherein the one or more transmit parameters include at least one of:
            a number of hybrid automatic repeat request retransmissions,
            a number of subchannels to be used by the UE in a slot, a modulation and coding scheme, or
a channel occupancy ratio limit.

20. The non-transitory computer-readable medium of claim 19, wherein the one or more instructions, that cause the UE to measure the first CBR for the first beam group, cause the UE to:
receive, from the second UE or one or more other UEs, using the beam or another beam included in the first beam group, an indication of a number of resources that have been used or are to be used by the second UE or the one or more other UEs to receive signals; and
determine the first CBR for the first beam group based at least in part on the number of resources that have been used or are to be used by the second UE or the one or more other UEs to receive the signals.

21. The non-transitory computer-readable medium of claim 20, wherein the one or more instructions, that cause the UE to receive the indication of the number of resources that have been used or are to be used by the second UE or the one or more other UEs to receive the signals, cause the UE to:
receive the indication via at least one of an announcement message or a physical sidelink feedback channel signal.

22. The non-transitory computer-readable medium of claim 19, wherein the second beam group includes a receive beam that the second UE is to use to receive the signal from the UE.

23. The non-transitory computer-readable medium of claim 19, wherein the one or more instructions further cause the UE to:
determine the one or more transmit parameters based at least in part on at least one of the first CBR or the second CBR.

24. The non-transitory computer-readable medium of claim 19, wherein the one or more instructions further cause the UE to:
receive, from a third UE, an indication of a third CBR for a third beam group associated with the third UE; and
transmit, to the third UE using a beam included in the first beam group, a different signal using one or more transmit parameters that are based at least in part on at least one of the first CBR or the third CBR.

25. The non-transitory computer-readable medium of claim 19, wherein the measurement is of a physical sidelink shared channel signal or a physical sidelink control channel signal and is performed by the second UE using one or more beams included in the second beam group.

26. An apparatus for wireless communication, comprising:
means for measuring, for a first beam group of a set of beam groups associated with the apparatus, a first channel busy ratio (CBR) for the first beam group;
means for receiving, from a user equipment (UE), from a second UE, an indication of a second CBR that is based at least in part on a measurement performed by the second UE, the second CBR being for a second beam group associated with the second UE; and
means for transmitting, to the UE using a beam included in the first beam group, a signal using one or more transmit parameters that are based at least in part on at least one of the first CBR or the second CBR, wherein the one or more transmit parameters include at least one of:
a number of hybrid automatic repeat request retransmissions,
a number of subchannels to be used by the UE in a slot,
a modulation and coding scheme, or
a channel occupancy ratio limit.

27. The apparatus of claim 26, wherein the means for measuring the first CBR for the first beam group comprises:
means for receiving, from the UE or one or more other UEs, using the beam or another beam included in the first beam group, an indication of a number of resources that have been used or are to be used by the UE or the one or more other UEs to receive signals; and
means for determining the first CBR for the first beam group based at least in part on the number of resources that have been used or are to be used by the UE or the one or more other UEs to receive the signals.

28. The apparatus of claim 26, wherein the second beam group includes a receive beam that the UE is to use to receive the signal from the apparatus.

29. The apparatus of claim 26, further comprising:
means for determining the one or more transmit parameters based at least in part on at least one of the first CBR or the second CBR.

30. The apparatus of claim 26, further comprising:
means for receiving, from the second UE, an indication of a third CBR for a third beam group associated with the second UE; and
means for transmitting, to the second UE using a beam included in the first beam group, a different signal using one or more transmit parameters that are based at least in part on at least one of the first CBR or the third CBR.

* * * * *